(12) United States Patent
Klug et al.

(10) Patent No.: US 11,204,462 B2
(45) Date of Patent: Dec. 21, 2021

(54) EYEPIECE FOR VIRTUAL, AUGMENTED, OR MIXED REALITY SYSTEMS

(71) Applicant: Magic Leap, Inc., Plantation, FL (US)

(72) Inventors: Michael Anthony Klug, Austin, TX (US); Robert Dale Tekolste, Ft. Lauderdale, FL (US); William Hudson Welch, Ft. Lauderdale, FL (US); Eric C. Browy, Meridian, ID (US); Victor Kai Liu, Mountain View, CA (US); Samarth Bhargava, Saratoga, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/570,912

(22) Filed: Sep. 13, 2019

(65) Prior Publication Data

US 2020/0012044 A1     Jan. 9, 2020

Related U.S. Application Data

(63) Continuation of application No. 15/877,117, filed on Jan. 22, 2018, now Pat. No. 10,451,799.
(Continued)

(51) Int. Cl.
*G02B 6/122*     (2006.01)
*G02B 6/02*     (2006.01)
(Continued)

(52) U.S. Cl.
CPC ......... *G02B 6/122* (2013.01); *G02B 6/02085* (2013.01); *G02B 27/0172* (2013.01); *G06T 19/006* (2013.01); *G02B 2027/0125* (2013.01)

(58) Field of Classification Search
None
See application file for complete search history.

(56) References Cited

U.S. PATENT DOCUMENTS

| 4,693,544 A | 9/1987 | Yamasaki et al. |
| 4,991,924 A | 2/1991 | Shankar et al. |
| (Continued) | | |

FOREIGN PATENT DOCUMENTS

| CN | 101133348 B | 9/2010 |
| CN | 102683803 | 9/2012 |
| (Continued) | | |

OTHER PUBLICATIONS

International Search Report and Written Opinion for PCT Application No. PCT/US 18/14735, dated Apr. 12, 2018.
(Continued)

*Primary Examiner* — Omar R Rojas
(74) *Attorney, Agent, or Firm* — Knobbe, Martens, Olson & Bear, LLP

(57) ABSTRACT

An eyepiece waveguide for an augmented reality. The eyepiece waveguide can include a transparent substrate with an input coupler region, a first orthogonal pupil expander (OPE) region, and an exit pupil expander (EPE) region. The input coupler region can couple an input light beam that is externally incident on the input coupler region into at least a first guided light beam that propagates inside the substrate. The first OPE region can divide the first guided beam into a plurality of replicated, spaced-apart beams. The EPE region can re-direct the replicated beams from the first OPE region such that they exit the substrate. The EPE region can have an amount of optical power.

24 Claims, 21 Drawing Sheets

Related U.S. Application Data

(60) Provisional application No. 62/449,524, filed on Jan. 23, 2017.

(51) Int. Cl.
*G02B 27/01* (2006.01)
*G06T 19/00* (2011.01)

(56) References Cited

U.S. PATENT DOCUMENTS

| | | | |
|---|---|---|---|
| 5,091,983 A * | 2/1992 | Lukosz | G01D 5/266 |
| | | | 250/231.19 |
| 5,187,372 A | 2/1993 | Clube | |
| 5,416,866 A | 5/1995 | Sahlén | |
| 5,544,268 A | 8/1996 | Bishel et al. | |
| 5,566,982 A | 10/1996 | Lehureau et al. | |
| 5,808,797 A | 9/1998 | Bloom et al. | |
| 5,825,448 A | 10/1998 | Bos et al. | |
| 5,915,051 A | 6/1999 | Damask et al. | |
| 6,014,197 A | 1/2000 | Hikmet | |
| 6,040,885 A | 3/2000 | Koike et al. | |
| 6,181,393 B1 | 1/2001 | Enomoto et al. | |
| 6,188,462 B1 | 2/2001 | Lavrentovich et al. | |
| 6,334,960 B1 | 1/2002 | Willson et al. | |
| 6,542,671 B1 | 4/2003 | Ma et al. | |
| 6,680,767 B2 | 1/2004 | Coates et al. | |
| 6,690,845 B1 | 2/2004 | Yoshimura et al. | |
| 6,735,224 B2 | 5/2004 | Murry et al. | |
| 6,750,941 B2 | 6/2004 | Satoh et al. | |
| 6,850,221 B1 | 2/2005 | Tickle | |
| 6,873,087 B1 | 3/2005 | Choi et al. | |
| 6,900,881 B2 | 5/2005 | Sreenivasan et al. | |
| 6,982,818 B2 | 1/2006 | Riza et al. | |
| D514,570 S | 2/2006 | Ohta | |
| 7,023,466 B2 | 4/2006 | Favalora et al. | |
| 7,070,405 B2 | 7/2006 | Sreenivasan et al. | |
| 7,098,572 B2 | 8/2006 | Choi et al. | |
| 7,122,482 B2 | 10/2006 | Xu et al. | |
| 7,140,861 B2 | 11/2006 | Watts et al. | |
| 7,206,107 B2 | 4/2007 | Levola | |
| 7,341,348 B2 | 3/2008 | Eagan | |
| 7,375,784 B2 | 5/2008 | Smith et al. | |
| 7,454,103 B2 | 11/2008 | Parriaux | |
| 7,471,362 B1 | 12/2008 | Jones | |
| 7,519,096 B2 | 4/2009 | Bouma et al. | |
| 7,573,640 B2 | 8/2009 | Nivon et al. | |
| 7,692,759 B2 | 4/2010 | Escuti et al. | |
| 7,705,943 B2 | 4/2010 | Kume et al. | |
| 7,990,543 B1 | 8/2011 | Mello | |
| 8,064,035 B2 | 11/2011 | Escuti et al. | |
| 8,076,386 B2 | 12/2011 | Xu et al. | |
| 8,160,411 B2 | 4/2012 | Levola et al. | |
| 8,233,204 B1 | 7/2012 | Robbins et al. | |
| 8,248,458 B2 | 8/2012 | Schowengerdt et al. | |
| 8,254,031 B2 | 8/2012 | Levola | |
| 8,264,623 B2 | 9/2012 | Marrucci | |
| 8,339,566 B2 | 12/2012 | Escuti et al. | |
| 8,494,229 B2 | 7/2013 | Järvenpää et al. | |
| 8,508,848 B2 | 8/2013 | Saarikko | |
| 8,547,638 B2 | 10/2013 | Levola | |
| 8,757,812 B2 | 6/2014 | Melville et al. | |
| 8,842,294 B2 | 9/2014 | Minoda | |
| 8,842,368 B2 * | 9/2014 | Simmonds | G02B 27/4205 |
| | | | 359/631 |
| 8,885,161 B2 | 11/2014 | Scheeline et al. | |
| 8,885,997 B2 | 11/2014 | Nguyen et al. | |
| 8,950,867 B2 | 2/2015 | Macnamara | |
| 8,965,152 B2 | 2/2015 | Simmonds | |
| 9,031,426 B2 | 7/2015 | Armstrong | |
| 9,164,290 B2 | 10/2015 | Robbins et al. | |
| 9,195,092 B2 | 11/2015 | Escuti et al. | |
| 9,215,293 B2 | 12/2015 | Miller | |
| D752,529 S | 3/2016 | Loretan et al. | |
| 9,283,720 B2 | 3/2016 | Minoda | |
| 9,310,559 B2 | 4/2016 | Macnamara | |
| 9,310,566 B2 | 4/2016 | Valera | |
| 9,341,846 B2 | 5/2016 | Popovich | |
| 9,345,402 B2 | 5/2016 | Gao | |
| 9,348,143 B2 | 5/2016 | Gao et al. | |
| D758,367 S | 6/2016 | Natsume | |
| D759,657 S | 7/2016 | Kujawski et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,575,366 B2 | 2/2017 | Srivastava et al. | |
| 9,664,905 B2 | 5/2017 | Bohn et al. | |
| 9,671,566 B2 | 6/2017 | Abovitz et al. | |
| 9,715,067 B1 | 7/2017 | Brown et al. | |
| D794,288 S | 8/2017 | Beers et al. | |
| 9,740,006 B2 | 8/2017 | Gao | |
| 9,791,700 B2 | 10/2017 | Schowengerdt et al. | |
| 9,791,703 B1 * | 10/2017 | Vallius | G02B 5/1814 |
| D805,734 S | 12/2017 | Fisher et al. | |
| 9,846,967 B2 | 12/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 9,904,058 B2 * | 2/2018 | Yeoh | G02B 27/0172 |
| 9,933,684 B2 | 4/2018 | Brown et al. | |
| 10,025,160 B2 | 7/2018 | Park et al. | |
| 10,067,347 B2 * | 9/2018 | Vallius | G02B 27/4205 |
| 10,156,725 B2 | 12/2018 | TeKolste et al. | |
| 10,191,288 B2 | 1/2019 | Singer et al. | |
| 10,254,454 B2 | 4/2019 | Klug et al. | |
| 10,260,864 B2 | 4/2019 | Edwin et al. | |
| 10,261,318 B2 * | 4/2019 | TeKolste | G02B 6/0026 |
| 10,267,970 B2 * | 4/2019 | Jones, Jr. | G06F 3/013 |
| 10,345,592 B2 | 7/2019 | Samec et al. | |
| 10,379,358 B2 | 8/2019 | Olkkonen et al. | |
| 10,386,639 B2 | 8/2019 | Samec et al. | |
| 10,409,059 B2 | 9/2019 | Mason | |
| 10,451,799 B2 | 10/2019 | Klug et al. | |
| 10,466,478 B2 | 11/2019 | Klug et al. | |
| 10,466,561 B2 | 11/2019 | Oh | |
| 10,534,179 B1 | 1/2020 | Ahuja et al. | |
| 10,690,826 B2 | 6/2020 | Klug et al. | |
| 10,690,915 B2 | 6/2020 | Popovich | |
| 10,852,547 B2 | 12/2020 | Bhargava et al. | |
| 2002/0097962 A1 | 7/2002 | Yoshimura et al. | |
| 2002/0101560 A1 | 8/2002 | Satoh et al. | |
| 2002/0126249 A1 | 9/2002 | Liang et al. | |
| 2002/0167638 A1 | 11/2002 | Byun et al. | |
| 2002/0172237 A1 | 11/2002 | Murry et al. | |
| 2003/0050416 A1 | 3/2003 | Smith et al. | |
| 2003/0147112 A1 | 8/2003 | Mukawa | |
| 2003/0161573 A1 | 8/2003 | Ishida | |
| 2004/0007465 A1 | 1/2004 | Goldberg et al. | |
| 2004/0022888 A1 | 2/2004 | Sreenivasan et al. | |
| 2004/0120647 A1 | 6/2004 | Sakata et al. | |
| 2004/0150141 A1 | 8/2004 | Chao et al. | |
| 2004/0184163 A1 | 9/2004 | Nishioka et al. | |
| 2004/0189938 A1 | 9/2004 | Eagan | |
| 2004/0191429 A1 | 9/2004 | Patrick | |
| 2005/0042391 A1 | 2/2005 | Ryan et al. | |
| 2005/0072959 A1 | 4/2005 | Moia et al. | |
| 2005/0073577 A1 | 4/2005 | Sudo et al. | |
| 2005/0213212 A1 | 9/2005 | Ooi et al. | |
| 2005/0232530 A1 | 10/2005 | Kekas | |
| 2005/0253112 A1 | 11/2005 | Kelly et al. | |
| 2005/0270312 A1 | 12/2005 | Lad et al. | |
| 2005/0270461 A1 | 12/2005 | Kitson et al. | |
| 2006/0028436 A1 | 2/2006 | Armstrong | |
| 2006/0120247 A1 | 6/2006 | Noda et al. | |
| 2006/0121358 A1 | 6/2006 | Rich et al. | |
| 2006/0126179 A1 | 6/2006 | Levola | |
| 2006/0157443 A1 | 7/2006 | Mei | |
| 2006/0221448 A1 | 10/2006 | Nivon et al. | |
| 2006/0227283 A1 | 10/2006 | Ooi et al. | |
| 2006/0228073 A1 | 10/2006 | Mukawa et al. | |
| 2007/0031097 A1 | 2/2007 | Heikenfeld et al. | |
| 2007/0070504 A1 | 3/2007 | Akutsu | |
| 2007/0081123 A1 | 4/2007 | Lewis | |
| 2007/0109466 A1 | 5/2007 | Choi et al. | |
| 2007/0229955 A1 | 10/2007 | Kawamura et al. | |

(56) References Cited

U.S. PATENT DOCUMENTS

| | | |
|---|---|---|
| 2007/0273957 A1 | 11/2007 | Zalevsky et al. |
| 2008/0043166 A1 | 2/2008 | Liu et al. |
| 2008/0043334 A1 | 2/2008 | Itzkovitch et al. |
| 2008/0169479 A1 | 7/2008 | Xu et al. |
| 2009/0141216 A1 | 6/2009 | Marrucci |
| 2009/0303599 A1 | 12/2009 | Levola |
| 2010/0142570 A1 | 6/2010 | Konttinen et al. |
| 2010/0165465 A1 | 7/2010 | Levola |
| 2010/0177388 A1 | 7/2010 | Cohen et al. |
| 2010/0207964 A1 | 8/2010 | Kimmel et al. |
| 2010/0214659 A1 | 8/2010 | Levola |
| 2010/0225876 A1 | 9/2010 | Escuti et al. |
| 2010/0231693 A1 | 9/2010 | Levola |
| 2010/0232016 A1 | 9/2010 | Landa et al. |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0321781 A1 | 12/2010 | Levola et al. |
| 2011/0002143 A1 | 1/2011 | Saarikko et al. |
| 2011/0019874 A1 | 1/2011 | Jäervenpää |
| 2011/0024950 A1 | 2/2011 | Kruglick |
| 2011/0049761 A1 | 3/2011 | Mataki |
| 2011/0194058 A1 | 8/2011 | Amos et al. |
| 2011/0213664 A1 | 9/2011 | Osterhout et al. |
| 2011/0242461 A1 | 10/2011 | Escuti et al. |
| 2011/0242661 A1 | 10/2011 | Simmonds |
| 2012/0021140 A1 | 1/2012 | Dijksman et al. |
| 2012/0033306 A1 | 2/2012 | Valera et al. |
| 2012/0127062 A1 | 5/2012 | Bar-Zeev et al. |
| 2012/0162549 A1 | 6/2012 | Gao et al. |
| 2012/0206485 A1 | 8/2012 | Osterhout et al. |
| 2012/0206812 A1 | 8/2012 | Saito et al. |
| 2012/0218301 A1 | 8/2012 | Miller |
| 2012/0242918 A1 | 9/2012 | Valyukh et al. |
| 2012/0320460 A1 | 12/2012 | Levola |
| 2012/0327330 A1 | 12/2012 | Takahashi et al. |
| 2012/0328725 A1 | 12/2012 | Minoda |
| 2013/0051730 A1 | 2/2013 | Travers et al. |
| 2013/0082922 A1 | 4/2013 | Miller |
| 2013/0093936 A1 | 4/2013 | Scheeline et al. |
| 2013/0117377 A1 | 5/2013 | Miller |
| 2013/0125027 A1 | 5/2013 | Abovitz |
| 2013/0169909 A1 | 7/2013 | Srivastava et al. |
| 2013/0208234 A1 | 8/2013 | Lewis |
| 2013/0222384 A1 | 8/2013 | Futterer |
| 2013/0235440 A1 | 9/2013 | Takeda et al. |
| 2013/0242262 A1 | 9/2013 | Lewis |
| 2013/0242392 A1 | 9/2013 | Amirparviz et al. |
| 2013/0314765 A1 | 11/2013 | Padilla et al. |
| 2013/0314789 A1 | 11/2013 | Saarikko et al. |
| 2013/0321747 A1 | 12/2013 | Kondo et al. |
| 2013/0322810 A1 | 12/2013 | Robbins |
| 2014/0043689 A1 | 2/2014 | Mason |
| 2014/0055740 A1 | 2/2014 | Spaulding et al. |
| 2014/0064655 A1 | 3/2014 | Nguyen et al. |
| 2014/0071539 A1 | 3/2014 | Gao |
| 2014/0104665 A1 | 4/2014 | Popovich et al. |
| 2014/0113829 A1 | 5/2014 | Ma et al. |
| 2014/0140653 A1 | 5/2014 | Brown et al. |
| 2014/0140654 A1 | 5/2014 | Brown et al. |
| 2014/0177023 A1 | 6/2014 | Gao et al. |
| 2014/0211322 A1 | 7/2014 | Bohn et al. |
| 2014/0218468 A1 | 8/2014 | Gao et al. |
| 2014/0232993 A1 | 8/2014 | Kim |
| 2014/0233879 A1 | 8/2014 | Gibson et al. |
| 2014/0267420 A1 | 9/2014 | Schowengerdt |
| 2014/0300695 A1 | 10/2014 | Smalley et al. |
| 2014/0306866 A1 | 10/2014 | Miller et al. |
| 2014/0346694 A1 | 11/2014 | Minoda |
| 2015/0002528 A1 | 1/2015 | Bohn et al. |
| 2015/0015879 A1 | 1/2015 | Papadopoulos et al. |
| 2015/0016777 A1 | 1/2015 | Abovitz et al. |
| 2015/0062500 A1 | 3/2015 | Park et al. |
| 2015/0086163 A1 | 3/2015 | Valera et al. |
| 2015/0103306 A1 | 4/2015 | Kaji et al. |
| 2015/0146147 A1 | 5/2015 | Choi et al. |
| 2015/0168731 A1 | 6/2015 | Robbins |
| 2015/0178939 A1 | 6/2015 | Bradski et al. |
| 2015/0205126 A1 | 7/2015 | Schowengerdt |
| 2015/0205182 A1 | 7/2015 | Leister |
| 2015/0222883 A1 | 8/2015 | Welch |
| 2015/0222884 A1 | 8/2015 | Cheng |
| 2015/0234205 A1 | 8/2015 | Schowengerdt |
| 2015/0235431 A1 | 8/2015 | Schowengerdt |
| 2015/0235440 A1 | 8/2015 | Schowengerdt |
| 2015/0241705 A1 | 8/2015 | Abovitz et al. |
| 2015/0260992 A1 | 9/2015 | Luttmann |
| 2015/0268415 A1 | 9/2015 | Schowengerdt et al. |
| 2015/0289762 A1 | 10/2015 | Popovich et al. |
| 2015/0293409 A1 | 10/2015 | Usukura et al. |
| 2015/0301249 A1 | 10/2015 | Pau et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0033698 A1 | 2/2016 | Escuti et al. |
| 2016/0033771 A1 | 2/2016 | Tremblay et al. |
| 2016/0041390 A1 | 2/2016 | Poon et al. |
| 2016/0055801 A1 | 2/2016 | Kim et al. |
| 2016/0077338 A1 | 3/2016 | Robbins et al. |
| 2016/0085300 A1 | 3/2016 | Robbins et al. |
| 2016/0097930 A1 | 4/2016 | Robbins et al. |
| 2016/0116739 A1 | 4/2016 | TeKolste et al. |
| 2016/0116979 A1 | 4/2016 | Border |
| 2016/0119057 A1 | 4/2016 | Mekis et al. |
| 2016/0154150 A1 | 6/2016 | Simmonds et al. |
| 2016/0167422 A1 | 6/2016 | Brehm et al. |
| 2016/0209648 A1 | 7/2016 | Haddick et al. |
| 2016/0231567 A1 | 8/2016 | Saarikko et al. |
| 2016/0231570 A1 | 8/2016 | Levola et al. |
| 2016/0234485 A1 | 8/2016 | Robbins et al. |
| 2016/0238772 A1 | 8/2016 | Waldern et al. |
| 2016/0270656 A1 | 9/2016 | Samec et al. |
| 2016/0282615 A1 | 9/2016 | Yokoyama |
| 2016/0282808 A1 | 9/2016 | Smalley |
| 2016/0291328 A1 | 10/2016 | Popovich |
| 2016/0320536 A1 | 11/2016 | Simmonds et al. |
| 2017/0007182 A1 | 1/2017 | Samec et al. |
| 2017/0010466 A1 | 1/2017 | Klug et al. |
| 2017/0010488 A1 | 1/2017 | Klug et al. |
| 2017/0131595 A1 | 5/2017 | Yim et al. |
| 2017/0153460 A1 | 6/2017 | Vallius et al. |
| 2017/0219841 A1* | 8/2017 | Popovich ............... G02B 27/48 |
| 2017/0307886 A1 | 10/2017 | Stenberg et al. |
| 2017/0322419 A1 | 11/2017 | TeKolste et al. |
| 2017/0373459 A1 | 12/2017 | Weng et al. |
| 2018/0004289 A1 | 1/2018 | Wilson et al. |
| 2018/0046859 A1 | 2/2018 | Jarvenpaa |
| 2018/0059320 A1 | 3/2018 | Miller et al. |
| 2018/0081176 A1 | 3/2018 | Olkkonen et al. |
| 2018/0113309 A1 | 4/2018 | Robbins et al. |
| 2018/0113310 A1 | 4/2018 | Rolland et al. |
| 2018/0143438 A1* | 5/2018 | Oh ....................... G02B 6/0076 |
| 2018/0143470 A1 | 5/2018 | Oh et al. |
| 2018/0143485 A1* | 5/2018 | Oh ....................... G02B 5/1819 |
| 2018/0143509 A1 | 5/2018 | Oh |
| 2018/0164627 A1 | 6/2018 | Oh |
| 2018/0164645 A1 | 6/2018 | Oh et al. |
| 2018/0188528 A1 | 7/2018 | Browy |
| 2018/0188542 A1 | 7/2018 | Waldern et al. |
| 2018/0217395 A1 | 8/2018 | Lin et al. |
| 2018/0231771 A1 | 8/2018 | Schuck, III et al. |
| 2018/0239147 A1 | 8/2018 | Schowengerdt |
| 2018/0239177 A1 | 8/2018 | Oh |
| 2018/0275350 A1 | 9/2018 | Oh |
| 2018/0275409 A1 | 9/2018 | Gao |
| 2018/0348876 A1 | 12/2018 | Banerjee et al. |
| 2019/0033684 A1 | 1/2019 | Favalora et al. |
| 2019/0086674 A1 | 3/2019 | Sinay et al. |
| 2019/0121142 A1 | 4/2019 | Tekolste |
| 2019/0187474 A1 | 6/2019 | Bhargava |

(56) References Cited

U.S. PATENT DOCUMENTS

| | | |
|---|---|---|
| 2019/0227211 A1 | 7/2019 | Klug et al. |
| 2019/0235252 A1 | 8/2019 | Freedman et al. |
| 2019/0243141 A1 | 8/2019 | TeKolste |
| 2019/0243142 A1 | 8/2019 | Tekolste |
| 2020/0159023 A1 | 5/2020 | Bhargava |
| 2020/0174304 A1 | 6/2020 | Oh |
| 2020/0400955 A1 | 12/2020 | Messer |
| 2021/0041704 A1 | 2/2021 | Bhargava |
| 2021/0302802 A1 | 9/2021 | Oh |

FOREIGN PATENT DOCUMENTS

| | | |
|---|---|---|
| CN | 103196562 A | 7/2013 |
| CN | 104145208 | 11/2014 |
| CN | 104423042 A | 3/2015 |
| CN | 104903117 A | 9/2015 |
| CN | 105005106 A | 10/2015 |
| CN | 106101691 A | 11/2016 |
| CN | 106842397 | 6/2017 |
| EP | 0 132 077 | 1/1985 |
| EP | 0 415 735 | 3/1991 |
| EP | 0 549 283 | 6/1993 |
| EP | 2 065 750 | 6/2009 |
| EP | 2 664 430 | 11/2013 |
| EP | 2 767 852 | 8/2014 |
| GB | 2539166 | 12/2016 |
| JP | 62-269174 | 11/1987 |
| JP | 1991-84516 | 4/1991 |
| JP | 2000-121815 A | 4/2000 |
| JP | 2001-91715 | 4/2001 |
| JP | 2004-184505 | 7/2004 |
| JP | 2005-316304 | 11/2005 |
| JP | 2005-316314 | 11/2005 |
| JP | 2010-271565 | 12/2010 |
| JP | 5151518 B2 | 2/2013 |
| JP | 2014-89476 A | 5/2014 |
| JP | 2014-132328 | 7/2014 |
| JP | WO 2014/156167 | 10/2014 |
| JP | 2014-224846 | 12/2014 |
| JP | 2016-085426 A | 5/2016 |
| JP | 2016-177232 A | 10/2016 |
| WO | WO 2005/024469 | 3/2005 |
| WO | WO 2006/064301 | 6/2006 |
| WO | WO 2006/092758 | 9/2006 |
| WO | WO 2006/106501 | 10/2006 |
| WO | WO 2008/130555 | 10/2008 |
| WO | WO 2008/130561 | 10/2008 |
| WO | WO 2010/067114 | 6/2010 |
| WO | WO 2011/107831 | 9/2011 |
| WO | WO 2013/054115 | 4/2013 |
| WO | WO 2014/016403 | 1/2014 |
| WO | WO 2014/036537 | 3/2014 |
| WO | WO 2014/091204 | 6/2014 |
| WO | WO 2014/172252 | 10/2014 |
| WO | WO 2015/081313 | 6/2015 |
| WO | WO 2016/020643 | 2/2016 |
| WO | WO 2016/042283 | 3/2016 |
| WO | WO 2016/054092 | 4/2016 |
| WO | WO 2016/082031 | 6/2016 |
| WO | WO 2016/113533 | 7/2016 |
| WO | WO 2016/162606 | 10/2016 |
| WO | WO 2016/205249 | 12/2016 |
| WO | WO 2016/205256 | 12/2016 |
| WO | WO 2017/123793 | 7/2017 |
| WO | WO 2017/180403 | 10/2017 |
| WO | WO 2017/213907 | 12/2017 |
| WO | WO 2018/093730 | 5/2018 |
| WO | WO 2018/094079 | 5/2018 |
| WO | WO 2018/094093 | 5/2018 |
| WO | WO 2018/106963 | 6/2018 |
| WO | WO 2018/112101 | 6/2018 |
| WO | WO 2018/136892 | 7/2018 |
| WO | WO 2018/156779 | 8/2018 |
| WO | WO 2018/156784 | 8/2018 |
| WO | WO 2018/175343 | 9/2018 |
| WO | WO 2018/175488 | 9/2018 |
| WO | WO 2019/118930 | 6/2019 |
| WO | WO 2020/069026 | 4/2020 |
| WO | WO 2020/106824 | 5/2020 |
| WO | WO 2020/0257469 | 12/2020 |

OTHER PUBLICATIONS

Invitation to Pay Additional Fees for PCT Application No. PCT/US 18/65856, dated Mar. 4, 2019.

International Search Report and Written Opinions for PCT Application No. PCT/US 18/65856, dated May 1, 2019.

International Preliminary Report on Patentability for PCT Application No. PCT/US 18/14735 dated Jul. 23, 2019.

Chiu et al.: "P-33: Large Area Self-aligning of Liquid Crystal Molecules induced by Nanoimprinting Lithography and a Multiple Function Film Made Therein," Eurodisplay, Sep. 20, 2005-Sep. 22, 2020, pp. 323-325.

Aieta, F. et al., "Multiwavelength achromatic metasurfaces by dispersive phase compensation," Science, vol. 347, Issue 6228, Mar. 20, 2015, in 5 pages. URL: www.sciencemag.org.

Arbabi, A. et al., "Dielectric melasurfaces for complete control of phase and polarization with subwavelength spatial resolution and high transmission," Nature Nanotechnology, published online Aug. 31, 2015, in 8 pages. URL: www.nature.com/naturenanotechnology.

ARToolKit: https://web.archive.org/web/20051013062315/http://www.hiti.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Chigrinov, V.: Photoaligning and Photopatterning Technology: Applications in Displays and Photonics, Proceedings of SPIE, Emerging Liquid Crystal Technologies I, vol. 9769, Mar. 7, 2016, in 11 pages.

Choi, Y. et al.: "Determination of Surface Nematic Liquid Crystal Anchoring Strength Using Nano-scale Surface Grooves," Optical Society of America, May 2013, in 10 pages.

Crawford, et al.: "Liquid-crystal diffraction gratings using polarization holography alignment techniques," Journal of Applied Physics 98, 123102, 2005.

Cunningham et al., "A plastic colorimetric resonant optical biosensor for multiparallel detection of label-free biochemical interactions," Sensors and Actuators B, vol. 85, 2190226, Jul. 2002, in 8 pages.

Dierking, I.: "Chiral Liquid Crystals: Structures, Phases, Effects," Symmetry, (Jun. 2014) 6(2): 444-472.

Digilens, White Paper Digilens' Waveguide HUD Technoloby Jul. 20, 2016.

"Metamaterials". Duke University. Center for Metamaterials and Integrated Plasmonics. May 11, 2015 (Retrieved from the internet Aug. 12, 2016). URL: http://web.archive.org/web/20150511045547/http://metamaterials.duke.edu/research/metamaterials.

Escuti, M. et al., "39.4: Polarization-independent switching with high contrast from a liquid crystal polarization grating", SID Symposium Digest, vol. 37, pp. 1443-1446, Jun. 2006, in 5 pages.

Escuti, M. et al., "Polarization-Independent LC Microdisplays Using Liquid Crystal Polarization Gratings: A Viable Solution", ILCC presentation, Jul. 1, 2008, in 15 pages.

Escuti J., "Polarization-Independent Modulation & Simplified Spectropolarimetry Using LC Polarization Gratings," paper #39.4, posters P-209, P-167, SID Symposium Digest, 2006.

Gear, C. et al.: "Engineered Liquid Crystal Anchoring Energies with Nanopatterned Surfaces," Optical Society of America, Jan. 2015, in 8 pages.

(56) References Cited

OTHER PUBLICATIONS

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Kim, J. et al., "Wide-angle, nonmechanical beam steering with high throughput utilizing polarization gratings", Applied Optics, vol. 50, No. 17, Jun. 10, 2011, in 4 pages.
Komanduri, et al., "Multi-twist retarders: broadband retadation control using self-aligning reactive liquid crystal layers," Optical Society of America, Optics Express 404, vol. 21, No. 1, Jan. 14, 2013.
Komanduri, R. et al., "18:3: Late-News Paper: Polarization Independent Liquid Crystal Microdisplays", SID Digest, vol. 39, No. 1, pp. 236-239, May 2008, in 4 pages.
Komanduri, R. et al., "34.4L: Late-News Paper: Polarization Independent Projection Systems using Thin Film Polymer Polarization Gratings and Standard Liquid Crystal Microdisplays", SID Digest, vol. 40, No. 1, Jun. 2009, in 4 pages.
Komanduri, R. et al.,"Elastic Continuum Analysis of the Liquid Crystal Polarization Grating", Physical review. E, Statistical, nonlinear, and soft matter physics, May 25, 2007, in 8 pages.
Komanduri, R. et al., "Polarization Independent Projection Systems using Thin Film Polymer Polarization Gratings and Standard Liquid Crystal Microdisplays", SID-Display week presentation, Jun. 3, 2009, in 12 pages.
Komanduri, R. et al., "Polarization-independent modulation for projection displays using small-period LC polarization gratings", Journal of the Society for information display, vol. 15, No. 8, pp. 589-594, Aug. 2007, in 7 pages.
Kurioz, Y. et al.: "P-128: Orientation of a Reactive Mesogen on Photosensitive Surface," Society for Information Display (SID) Symposium Digest of Technical Papers, May 2007, in 3 pages.
Lee, et al., Negative dispersion of birefringence in two-dimensionally self-organized smectic liquid crystal and monomer thin film, Optics Letters, vol. 39, No. 17, Sep. 1, 2014.
Lim, Y. et al., "Anisotropic Nano-Imprinting Technique for Fabricating a Patterned Optical Film of a Liquid Crystalline Polymer", Journal of Nanoscience and Nanotechnology, vol. 8, pp. 4775-4778, Oct. 2008, in 4 pages.
Lin, D. et al.,"Dielectric gradient metasurface optical elements", Science, vol. 345, Issue 6194, Jul. 18, 2014, in 6 pages.
Lin D. et al., "Supplementary Materials for Dielectric gradient metasurface optical elements", Science, vol. 345, Issue 6194, Jul. 18, 2014, in 22 pages.
Lin, R. et al. Molecular-Scale soft imprint lithography for alignment layers in liquid crystal devices; Nano Letters, vol. 7, No. 6; Publication [online]. May 23, 2007 [retrieved Feb. 7, 2018]. Retrieved from the Internet: URL:https://pubs.acs.org/doi/abs/10.1021/nl070559y; pp. 1613-1621.
Lub J. et al.: "Formation of Optical Films by Photo-Polymerisation of Liquid Crystalline Acrylates and Application of These Films in Liquid Crystal Display Technology," Mol Cryst Liq Cryst., (May 2005) 429(1):77-99.
Nikolova et al., "Diffraction Efficiency and Selectivity of Polarization Holographic Recording", Optica Acta: Int'l J Optics (1984) 31(5):579-588.
Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.
Oh C., Thesis: "Broadband Polarization Gratings for Efficient Liquid Crystal Display, Beam Steering, Spectropolarimetry, and Fresnel Zone Plate", N. C. State University, Electrical Engineering (2009) in 190 pages.
Oh, C. et al., "Numerical analysis of polarization gratings using the finite-difference time-domain method", Physical review A, vol. 76, Oct. 12, 2007, in 8 pages.
Oh, C. et al., "Polarization-Independent Modulation using Standard LCDs and Polymer PGs", 2008, in 6 pages.
Oh, C. et al., 16.2: Polarization-Independent Modulation Using Standard Liquid Crystal Microdisplays and Polymer Polarization Gratings, IDRC, 2008, in 4 pages.
Oh et al., "Polarization-Independent Modulation Using Standard Liquid Crystal Microdisplays and Polymer Polarization Gratings," NC State University; International Display Research Conference, vol. 28, pp. 298-301, 2008. in 16 pages.
Scheeline, et al., "Stacked Mutually Rotated Diffraction Gratings as Enablers of Portable Visible Spectrometry," Appl. Spectrosc. 70, 766-777, May 11, 2016.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Wikipedia Blind spot (vision), archived Jun. 9, 2016, in 2 pages. URL: https://web.archive.org/web/20160609224858/https:en.wikipedia.org/wiki/Blind_spot(vision).
Yang et al. Negative dispersion of birefringence of smectic liquid crystal-polymer compostie: dependence on the constituent molecules and temperature, Optical Society of America, Optics Express 2466, vol. 23, No. 3, Feb. 9, 2015.
Yu, N. et al., "Flat optics with designer metasurfaces", Review Article; Nature Materials, (Feb. 2014) 13: 139-150.
Yu, N. et al., "Light Propagation with Phase Discontinuities: Generalized Laws of Reflection and Refraction," Science, vol. 334, No. 333, Oct. 21, 2011, in 6 pages. URL: www.sciencemag.org.
International Preliminary Report for Patentability for PCT Application No. PCT/US18/65856, dated Jun. 16, 2020.
International Search Report and Written Opinion for PCT Application No. PCT/US2019/062386, dated Mar. 11, 2020.
International Preliminary Reporton Patentability for PCT Application No. PCT/US2019/062386, dated Jun. 3, 2021.
International Search Report and Written Opinion for PCT Application No. PCT/US 20/38456, dated Sep. 28, 2020.
Andrusyak, et al., External and common-cavity high spectral density beam combining of high power fiber lasers, Proceedings of SPIE—The International Society for Optical Engineering—Feb. 2008.
Chang, et al., "Tunable liquid crystal-resonant grating filters using superimposed grating structures fabricated by nanoimpriting lithography," The 17th Annual Meeting of the IEEE Lasers and Electro-Optics Society, 2004. LEOS 2004, pp. 298-299, vol. 1.
Chen, et al., Beam steering for virtual/augmented reality displays with a cycloidal diffractive waveplate, Apr. 4, 2016, Vo. 24, No. 7.
Gao, et al., "Wavefront distortion optimized with vol. Bragg gratings in photothermo refractive glass," vol. 41, No. 6, Mar. 15, 2016, Optics Letters.
Lee, et al., Photo-induced handedness inversion with opposite-handed cholesteric liquid crystan, Aug. 24, 2015, vol. 23, No. 17, Optics Express.
Nersisyan, et al., Polarization insenstivie imaging through polarization gratings, Feb. 2, 2009, vol. 17, No. 3, Optics Express 1817.
Park, et al., "Homeotropic alignment of liquid crystals on a nano-patterned polyimide surface using nanoimprint lithography," Soft Matter, 2011,7, 5610 (2017).
Serak, et al., All-opitcal diffractive/transmissive switch based on coupled cycloidal diffractive waveplates, Feb. 27, 2012, vol. 20, No. 5, Optics Express 5461.

\* cited by examiner

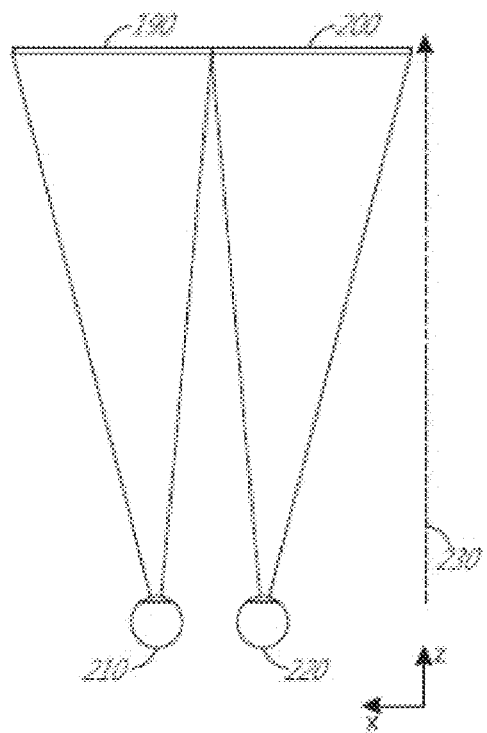 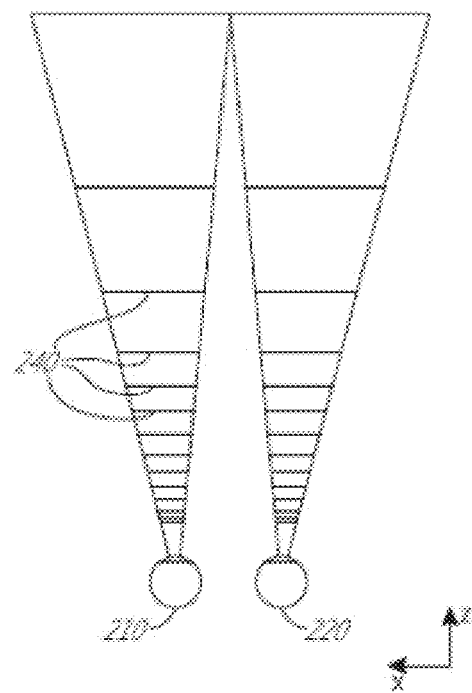
FIG. 3
(Prior Art)
FIG. 4

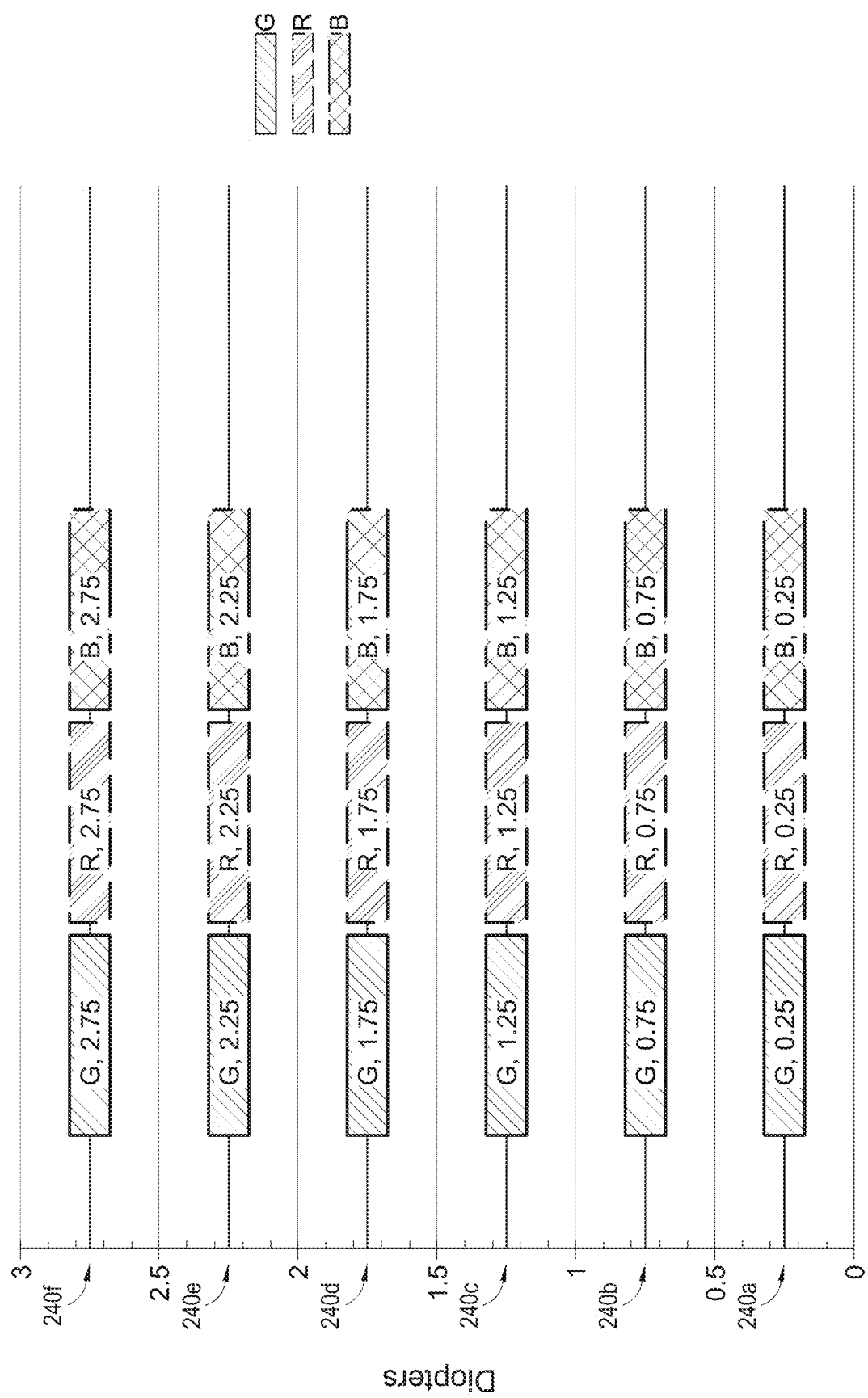

EYEPIECE FOR VIRTUAL, AUGMENTED, OR MIXED REALITY SYSTEMS

INCORPORATION BY REFERENCE TO ANY PRIORITY APPLICATIONS

This application is a continuation of U.S. patent application Ser. No. 15/877,117, filed Jan. 22, 2018, and entitled "EYEPIECE FOR VIRTUAL, AUGMENTED, OR MIXED REALITY SYSTEMS," which claims priority to U.S. Patent Application No. 62/449,524, filed Jan. 23, 2017, and entitled "EYEPIECE FOR VIRTUAL, AUGMENTED, OR MIXED REALITY SYSTEMS." The foregoing applications and any others for which a foreign or domestic priority claim is identified in the Application Data Sheet as filed with the present application are hereby incorporated by reference under 37 CFR 1.57.

BACKGROUND

Field

This disclosure relates to eyepieces for virtual reality, augmented reality, and mixed reality systems.

Description of the Related Art

Modern computing and display technologies have facilitated the development of virtual reality, augmented reality, and mixed reality systems. Virtual reality, or "VR," systems create a simulated environment for a user to experience. This can be done by presenting computer-generated image data to the user through a head-mounted display. This image data creates a sensory experience which immerses the user in the simulated environment. A virtual reality scenario typically involves presentation of only computer-generated image data rather than also including actual real-world image data.

Augmented reality systems generally supplement a real-world environment with simulated elements. For example, augmented reality, or "AR," systems may provide a user with a view of the surrounding real-world environment via a head-mounted display. However, computer-generated image data can also be presented on the display to enhance the real-world environment. This computer-generated image data can include elements which are contextually-related to the real-world environment. Such elements can include simulated text, images, objects, etc. Mixed reality, or "MR," systems are a type of AR system which also introduce simulated objects into a real-world environment, but these objects typically feature a greater degree of interactivity. The simulated elements can often times be interactive in real time.

FIG. 1 depicts an example AR/MR scene 1 where a user sees a real-world park setting 6 featuring people, trees, buildings in the background, and a concrete platform 20. In addition to these items, computer-generated image data is also presented to the user. The computer-generated image data can include, for example, a robot statue 10 standing upon the real-world platform 20, and a cartoon-like avatar character 2 flying by which seems to be a personification of a bumble bee, even though these elements 2, 10 are not actually present in the real-world environment.

SUMMARY

An eyepiece for a virtual reality, augmented reality, or mixed reality system is disclosed. In some embodiments, the eyepiece comprises: a first waveguide substrate that is at least partially transparent; an input coupler region formed on or in the first waveguide substrate and configured to couple at least one input light beam that is externally incident on the input coupler region into at least a first guided light beam that propagates inside the first waveguide substrate; a first orthogonal pupil expander (OPE) region formed on or in the first waveguide substrate and configured to divide the first guided light beam from the input coupler region into a plurality of parallel, spaced-apart light beams; and an exit pupil expander (EPE) region formed on or in the first waveguide substrate and configured to re-direct the light beams from the first OPE region such that they exit the first waveguide substrate, the EPE region comprising an amount of optical power.

In some embodiments, the EPE region comprises a diffraction grating to re-direct the light beams from the first OPE region such that they exit the first waveguide substrate, and wherein the diffraction grating of the EPE region comprises a plurality of curved lines whose curvature determines the optical power of the EPE region.

In some embodiments, the first waveguide substrate is configured to output a plurality of output beams such that they correspond to a first depth plane, the first depth plane being determined by the optical power of the EPE region of the first waveguide substrate.

In some embodiments, the eyepiece further comprises: a second waveguide substrate with an input coupler region, a first OPE region, and an EPE region, wherein the EPE region of the second waveguide substrate comprises an amount of optical power that is different than the optical power of the EPE region of the first waveguide substrate, and wherein the second waveguide substrate is configured to output a plurality of output beams such that they correspond to a second depth plane that is different from the first depth plane, the second depth plane being determined by the optical power of the EPE region of the second waveguide substrate.

BRIEF DESCRIPTION OF THE DRAWINGS

FIG. 3 illustrates a conventional display system for simulating three-dimensional image data for a user.

FIG. 4 illustrates aspects of an approach for simulating three-dimensional image data using multiple depth planes.

FIG. 8 illustrates an example of a stacked waveguide assembly in which each depth plane includes images formed using multiple different component colors.

DETAILED DESCRIPTION

Example HMD Device

Figure 1:
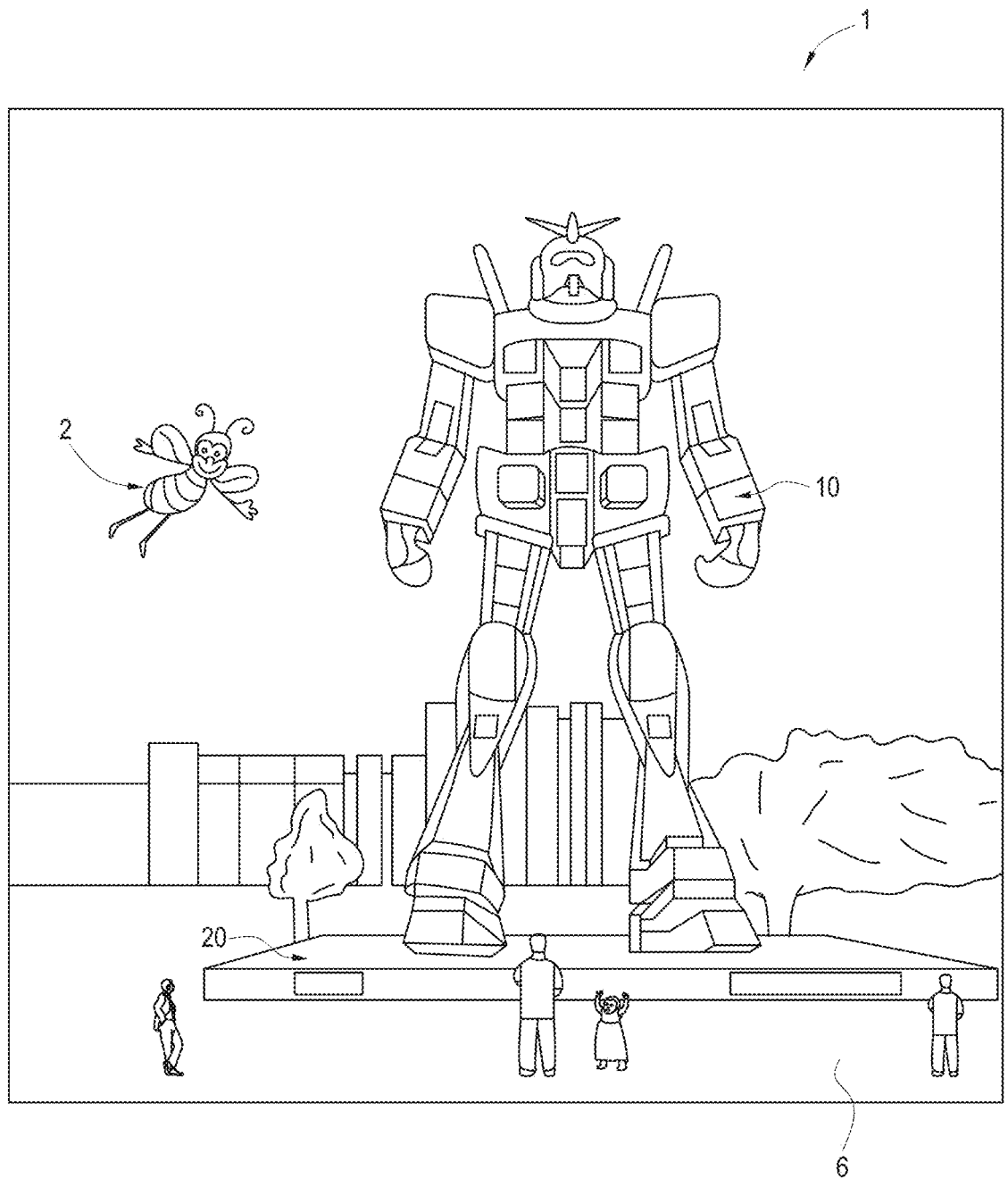
FIG. 1 illustrates a user's view of an augmented reality (AR) scene through an AR system.
Figure 2:
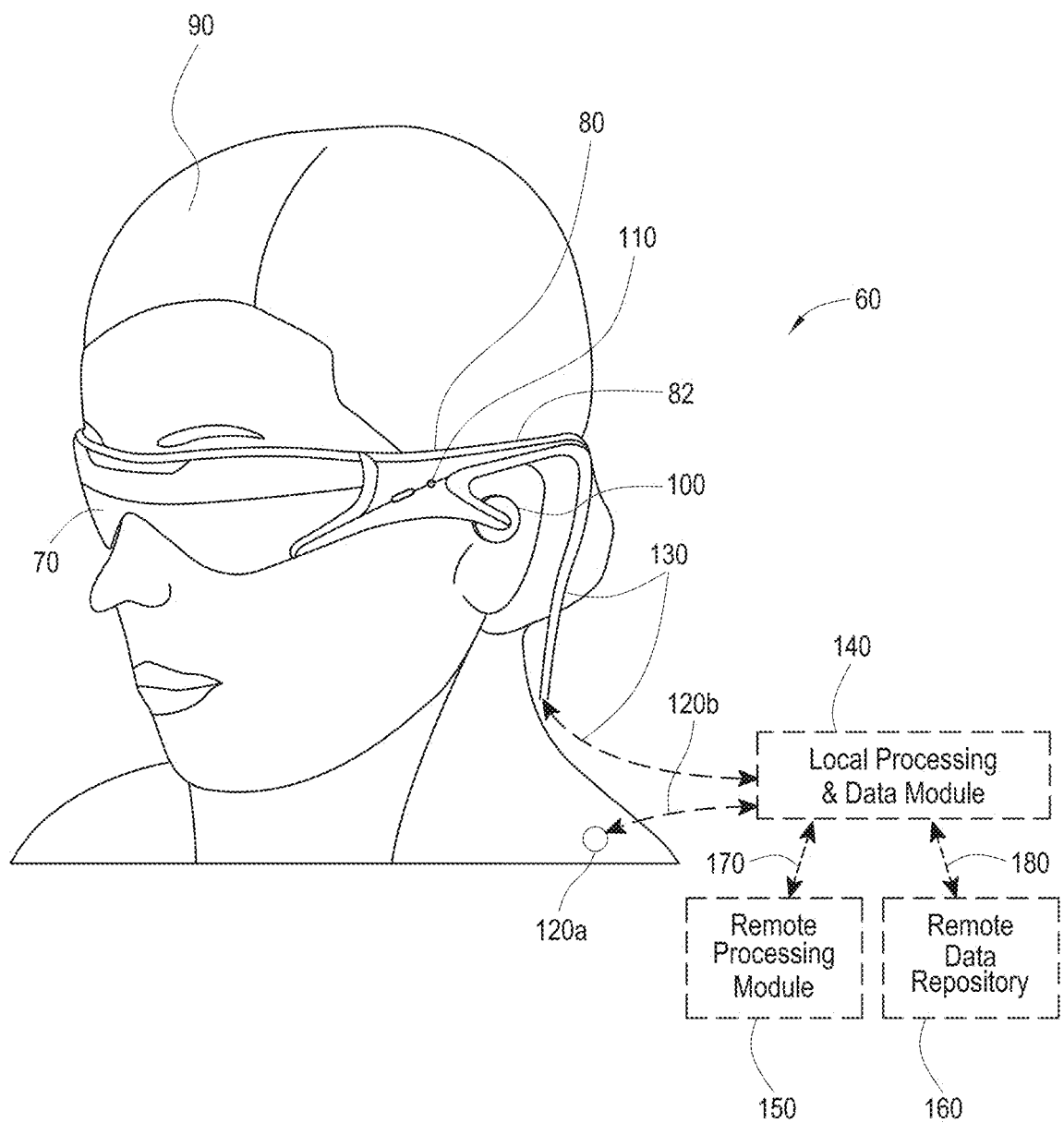
FIG. 2 illustrates an example of a wearable display system.

Virtual and augmented reality systems disclosed herein can include a display which presents computer-generated image data to a user. In some embodiments, the display systems are wearable, which may advantageously provide a more immersive VR or AR experience. FIG. 2 illustrates an example wearable display system 60. The display system 60 includes a display or eyepiece 70, and various mechanical and electronic modules and systems to support the functioning of that display 70. The display 70 may be coupled to a frame 80, which is wearable by a display system user 90 and which is configured to position the display 70 in front of the eyes of the user 90. The display 70 may be considered eyewear in some embodiments. In some embodiments, a speaker 100 is coupled to the frame 80 and is positioned adjacent the ear canal of the user 90. The display system may also include one or more microphones 110 to detect sound. The microphone 110 can allow the user to provide inputs or commands to the system 60 (e.g., the selection of voice menu commands, natural language questions, etc.), and/or can allow audio communication with other persons (e.g., with other users of similar display systems). The microphone 110 can also collect audio data from the user's surroundings (e.g., sounds from the user and/or environment). In some embodiments, the display system may also include a peripheral sensor 120a, which may be separate from the frame 80 and attached to the body of the user 90 (e.g., on the head, torso, an extremity, etc.). The peripheral sensor 120a may acquire data characterizing the physiological state of the user 90 in some embodiments.

The display 70 is operatively coupled by a communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or removably attached to the user 90 (e.g., in a backpack-style configuration or in a belt-coupling style configuration). Similarly, the sensor 120a may be operatively coupled by communications link 120b (e.g., a wired lead or wireless connectivity) to the local processor and data module 140. The local processing and data module 140 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 80 or otherwise attached to the user 90), such as image capture devices (e.g., cameras), microphones, inertial measurement units, accelerometers, compasses, GPS units, radio devices, gyros, and/or other sensors disclosed herein; and/or 2) acquired and/or processed using a remote processing module 150 and/or a remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and the remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone devices that communicate with the local processing and data module 140 by wired or wireless communication pathways.

The remote processing module 150 may include one or more processors to analyze and process data, such as image and audio information. In some embodiments, the remote data repository 160 may be a digital data storage facility, which may be available through the internet or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In other embodiments, all data is stored and all computations are performed in the local processing and data module, allowing fully autonomous use from a remote module.

The perception of an image as being "three-dimensional" or "3-D" may be achieved by providing slightly different presentations of the image to each eye of the user. FIG. 3 illustrates a conventional display system for simulating three-dimensional image data for a user. Two distinct images 190, 200—one for each eye 210, 220—are output to the user. The images 190, 200 are spaced from the eyes 210, 220 by a distance 230 along an optical or z-axis that is parallel to the line of sight of the user. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

However, the human visual system is complicated and providing a realistic perception of depth is challenging. For example, many users of conventional "3-D" display systems find such systems to be uncomfortable or may not perceive a sense of depth at all. Objects may be perceived as being "three-dimensional" due to a combination of vergence and accommodation. Vergence movements (e.g., rotation of the eyes so that the pupils move toward or away from each other to converge the respective lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, under normal conditions, a change in vergence will trigger a matching change in accommodation of lens shape and pupil size. As noted herein, many stereoscopic or "3-D" display systems display a scene using slightly different presentations (and, so, slightly different images) to each eye such that a three-dimensional perspective is perceived by the human visual system. Such systems can be uncomfortable for some users, however, since they simply provide image information at a single accommodated state and work against the "accommodation-vergence reflex." Display systems that provide a better match between accommodation and vergence may form more realistic and comfortable simulations of three-dimensional image data.

FIG. 4 illustrates aspects of an approach for simulating three-dimensional image data using multiple depth planes. With reference to FIG. 4, the eyes 210, 220 assume different accommodated states to focus on objects at various distances on the z-axis. Consequently, a particular accommodated state may be said to be associated with a particular one of the illustrated depth planes 240, which has an associated focal distance, such that objects or parts of objects in a particular depth plane are in focus when the eye is in the accommodated state for that depth plane. In some embodiments, three-dimensional image data may be simulated by providing different presentations of an image for each of the eyes 210, 220, and also by providing different presentations of the image corresponding to multiple depth planes. While the respective fields of view of the eyes 210, 220 are shown as being separate for clarity of illustration, they may overlap, for example, as distance along the z-axis increases. In addition, while the depth planes are shown as being flat for ease of illustration, it will be appreciated that the contours of a depth plane may be curved in physical space, such that all features in a depth plane are in focus with the eye in a particular accommodated state.

Figure 5A:
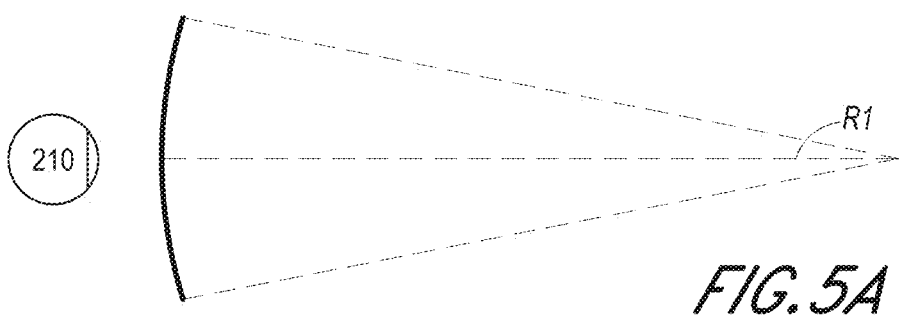
FIGS. 5A-5C illustrate relationships between radius of curvature and focal radius.
Figure 5B:
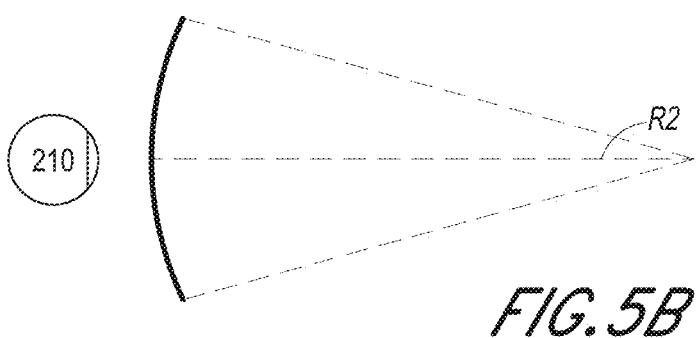
Figure 5C:
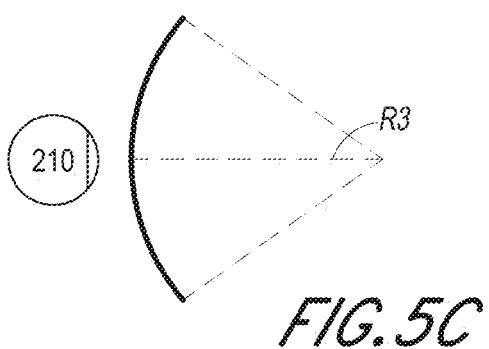

The distance between an object and an eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the user's eye 210. While only a single eye 210 is illustrated for clarity of illustration in FIGS. 5A-5C and other figures herein, it will be appreciated that the discussions regarding the eye 210 may be applied to both eyes 210 and 220 of a user.

A highly believable simulation of perceived depth may be achieved by providing, to the eye, different presentations of an image corresponding to each of a limited number of depth planes. The different presentations may be separately focused by the user's eye, thereby helping to provide the user with depth cues based on the amount of accommodation of the eye required to bring into focus different image features for the scene located on different depth planes and/or based on observing different image features on different depth planes being out of focus.

Example of a Waveguide Stack Assembly for an AR or MR Eyepiece

Figure 6:
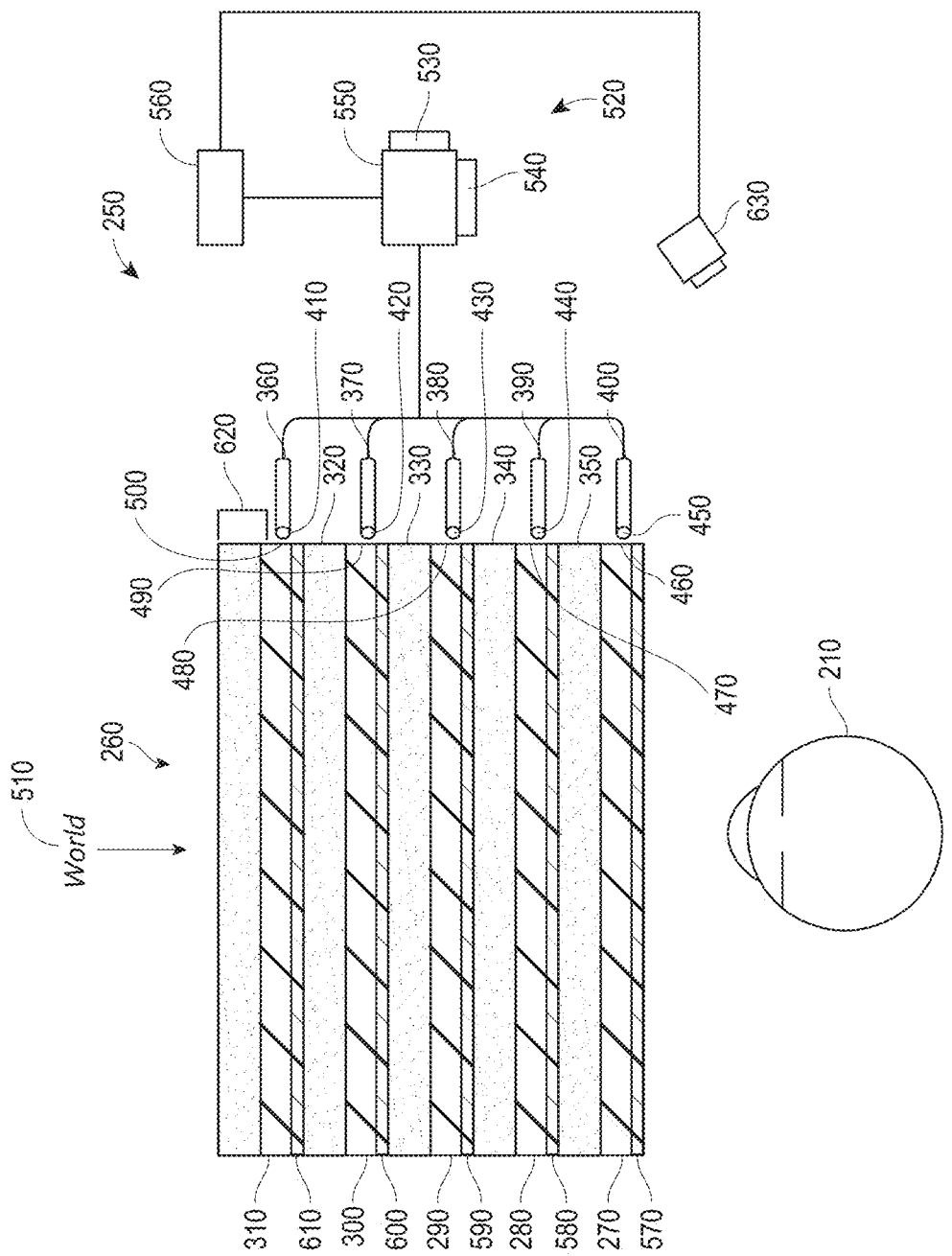
FIG. 6 illustrates an example of a waveguide stack for outputting image information to a user in an AR eyepiece.

FIG. 6 illustrates an example of a waveguide stack for outputting image information to a user in an AR eyepiece. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

The waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of each respective image injection device 360, 370, 380, 390, 400 and is injected into a corresponding input surface 460, 470, 480, 490, 500 of the respective waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the user's eye 210). In some embodiments, a beam of light (e.g. a collimated beam) may be injected into each waveguide and may be replicated, such as by sampling into beamlets by diffraction, in the waveguide and then directed toward the eye 210 with an amount of optical power corresponding to the depth plane associated with that particular waveguide. In some embodiments, a single one of the image injection devices 360, 370, 380, 390, 400 may be associated with, and inject light into, a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may transmit image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors.

In some embodiments, the light injected into the waveguides 270, 280, 290, 300, 310 is provided by a light projector system 520, which includes a light module 530, which may include a light source or light emitter, such as a light emitting diode (LED). The light from the light module 530 may be directed to, and modulated by, a light modulator 540 (e.g., a spatial light modulator), via a beamsplitter (BS) 550. The light modulator 540 may spatially and/or temporally change the perceived intensity of the light injected into the waveguides 270, 280, 290, 300, 310. Examples of spatial light modulators include liquid crystal displays (LCD), including a liquid crystal on silicon (LCOS) displays, and digital light processing (DLP) displays.

In some embodiments, the light projector system 520, or one or more components thereof, may be attached to the frame 80 (FIG. 2). For example, the light projector system 520 may be part of a temporal portion (e.g., ear stem 82) of the frame 80 or disposed at an edge of the display 70. In some embodiments, the light module 530 may be separate from the BS 550 and/or light modulator 540.

In some embodiments, the display system 250 may be a scanning fiber display comprising one or more scanning fibers to project light in various patterns (e.g., raster scan, spiral scan, Lissajous patterns, etc.) into one or more waveguides 270, 280, 290, 300, 310 and ultimately into the eye 210 of the user. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. One or more optical fibers may transmit light from the light module 530 to the one or more waveguides 270, 280, 290, 300, and 310. In addition, one or more intervening optical structures may be provided between the scanning fiber, or fibers, and the one or more waveguides 270, 280, 290, 300, 310 to, for example, redirect light exiting the scanning fiber into the one or more waveguides 270, 280, 290, 300, 310.

A controller 560 controls the operation of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310. In some embodiments, the controller may be a single integral device, or a distributed system connected by wired or wireless communication channels. The controller 560 may be part of the processing modules 140 or 150 (FIG. 2) in some embodiments.

The waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be output by the waveguide at locations at which the light propagating in the waveguide strikes a light extracting optical element. The out-coupling optical elements 570, 580, 590, 600, 610 may be, for example, diffractive optical features, including diffractive gratings, as discussed further herein. While the out-coupling optical elements 570, 580, 590, 600, 610 are illustrated as being disposed at the bottom major surfaces of the waveguides 270, 280, 290, 300, 310, in some embodiments they may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

Each waveguide 270, 280, 290, 300, 310 may output light to form an image corresponding to a particular depth plane. For example, the waveguide 270 nearest the eye may deliver collimated beams of light to the eye 210. The collimated beams of light may be representative of the optical infinity focal plane. The next waveguide up 280 may output collimated beams of light which pass through the first lens 350 (e.g., a negative lens) before reaching the eye 210. The first lens 350 may add a slight convex wavefront curvature to the collimated beams so that the eye/brain interprets light coming from that waveguide 280 as originating from a first focal plane closer inward toward the eye 210 from optical infinity. Similarly, the third waveguide 290 passes its output light through both the first lens 350 and the second lens 340 before reaching the eye 210. The combined optical power of the first lens 350 and the second lens 340 may add another incremental amount of wavefront curvature so that the eye/brain interprets light coming from the third waveguide 290 as originating from a second focal plane that is even closer inward from optical infinity than was light from the second waveguide 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate optical power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may output images set to the same depth plane, or multiple subsets of the waveguides 270, 280, 290, 300, 310 may output images set to the same plurality of depth planes, with one set for each depth plane. This can provide advantages for forming a tiled image to provide an expanded field of view at those depth planes.

The out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features with a diffractive efficiency sufficiently low such that only a portion of the power of the light in a beam is re-directed toward the eye 210 with each interaction, while the rest continues to move through a waveguide via TIR. Accordingly, the exit pupil of the light module 530 is replicated across the waveguide to create a plurality of output beams carrying the image information from light source 530, effectively expanding the number of locations where the eye 210 may intercept the replicated light source exit pupil. These diffractive features may also have a variable diffractive efficiency across their geometry to improve uniformity of light output by the waveguide.

In some embodiments, one or more diffractive features may be switchable between "on" states in which they actively diffract, and "off" states in which they do not significantly diffract. For instance, a switchable diffractive element may include a layer of polymer dispersed liquid crystal in which microdroplets form a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and IR light cameras) may be provided to capture images of the eye 210, parts of the eye 210, or at least a portion of the tissue surrounding the eye 210 to, for example, detect user inputs, extract biometric information from the eye, estimate and track the gaze direction of the eye, to monitor the physiological state of the user, etc. In some embodiments, the camera assembly 630 may include an image capture device and a light source to project light (e.g., IR or near-IR light) to the eye, which may then be reflected by the eye and detected by the image capture device. In some embodiments, the light source includes light emitting diodes ("LEDs"), emitting in IR or near-IR. In some embodiments, the camera assembly 630 may be attached to the frame 80 (FIG. 2) and may be in electrical communication with the processing modules 140 or 150, which may process image information from the camera assembly 630 to make various determinations regarding, for example, the physiological state of the user, the gaze direction of the wearer, iris identification, etc. In some embodiments, one camera assembly 630 may be utilized for each eye, to separately monitor each eye.

Figure 7A:
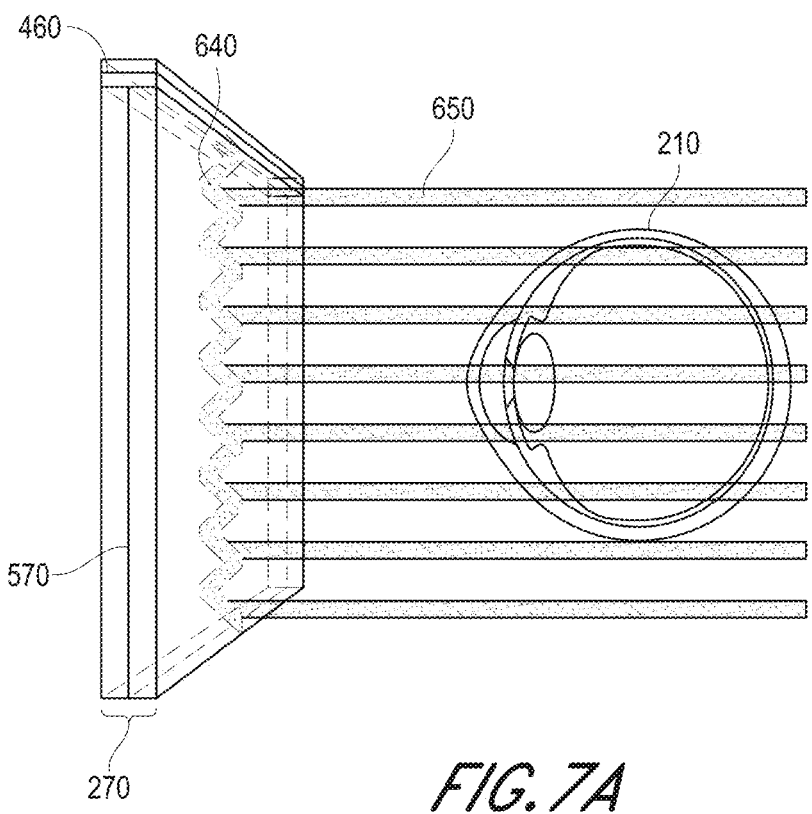
FIGS. 7A-7B illustrate examples of exit beams outputted by a waveguide.
Figure 7B:
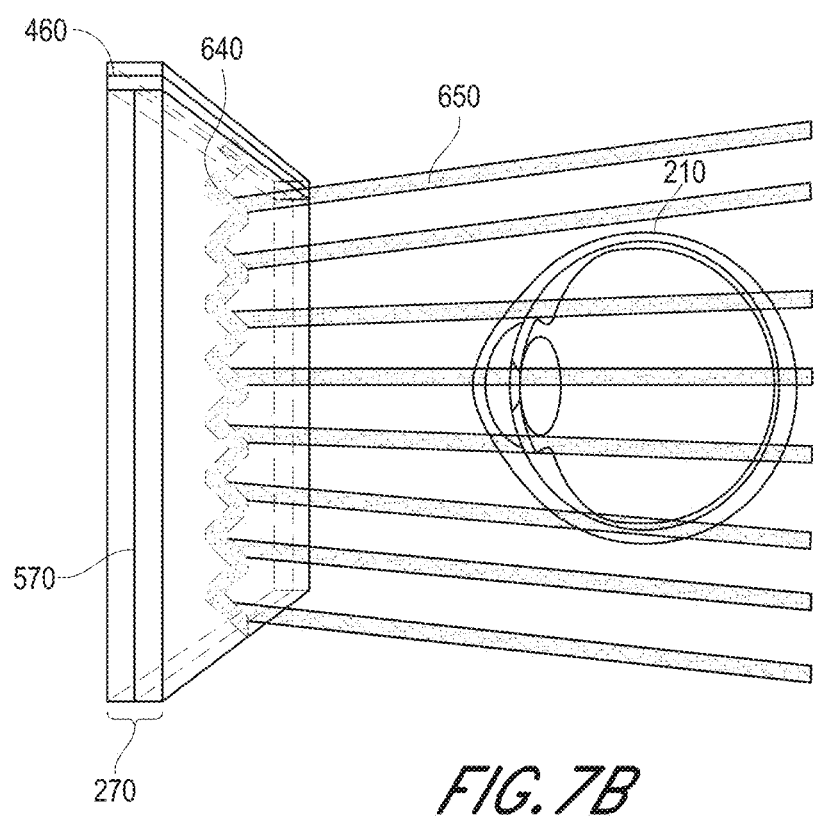

FIG. 7A illustrates an example of exit beams output by a waveguide. One waveguide is illustrated (with a perspective view), but other waveguides in the waveguide assembly 260 (FIG. 6) may function similarly. Light 640 is injected into the waveguide 270 at the input surface 460 of the waveguide 270 and propagates within the waveguide 270 by TIR. Through interaction with diffractive features, light exits the waveguide as exit beams 650. The exit beams 650 replicate the exit pupil from a projector device which projects images into the waveguide. Any one of the exit beams 650 includes a sub-portion of the total energy of the input light 640. And in a perfectly efficient system, the summation of the energy in all the exit beams 650 would equal the energy of the input light 640. The exit beams 650 are illustrated as being substantially parallel in FIG. 7A but, as discussed herein, some amount of optical power may be imparted depending on the depth plane associated with the waveguide 270. Parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, as shown in FIG. 7B, which would require the eye 210 to accommodate to a closer distance to bring it into focus on the retina and would be interpreted by the brain as light from a distance closer to the eye 210 than optical infinity.

In some embodiments, a full color image may be formed at each depth plane by overlaying images in each of the component colors (e.g., three or more component colors, such as red, green, and blue). FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different diopter powers following the letters G, R, and B. The numbers following each of these letters indicate diopters (1/m), or inverse distance of the depth plane from a user, and each box in the figure represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort or may decrease chromatic aberrations.

In some embodiments, light of each component color may be output by a single dedicated waveguide and, consequently, each depth plane may have multiple waveguides associated with it. In such embodiments, each box in the figure may be understood to represent an individual waveguide, and three waveguides may be provided per depth plane so as to display three component color images per depth plane. While the waveguides associated with each depth plane are shown adjacent to one another in this drawing for ease of illustration, it will be appreciated that, in a physical device, the waveguides may all be arranged in a stack with one waveguide per level. In some other embodiments, multiple component colors may be output by the same waveguide, such that, for example, only a single waveguide may be provided per depth plane.

With continued reference to FIG. 8, in some embodiments, G is the color green, R is the color red, and B is the color blue. In some other embodiments, other colors associated with other wavelengths of light, including yellow, magenta and cyan, may be used in addition to or may replace one or more of red, green, or blue. In some embodiments, features 320, 330, 340, and 350 may be active or passive optical filters configured to block or selectively pass light from the ambient environment to the user's eyes.

References to a given color of light throughout this disclosure should be understood to encompass light of one or more wavelengths within a range of wavelengths of light that are perceived by a user as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the user, for example, IR or ultraviolet wavelengths. IR light can include light with wavelengths in a range from 700 nm to 10 µm. In some embodiments, IR light can include near-IR light with wavelengths in a range from 700 nm to 1.5 µm. In addition, the in-coupling, out-coupling, and other light redirecting structures of the waveguides of the display 250 may be configured to direct and emit this light out of the display towards the user's eye 210, e.g., for imaging or user stimulation applications.

Figure 9A:
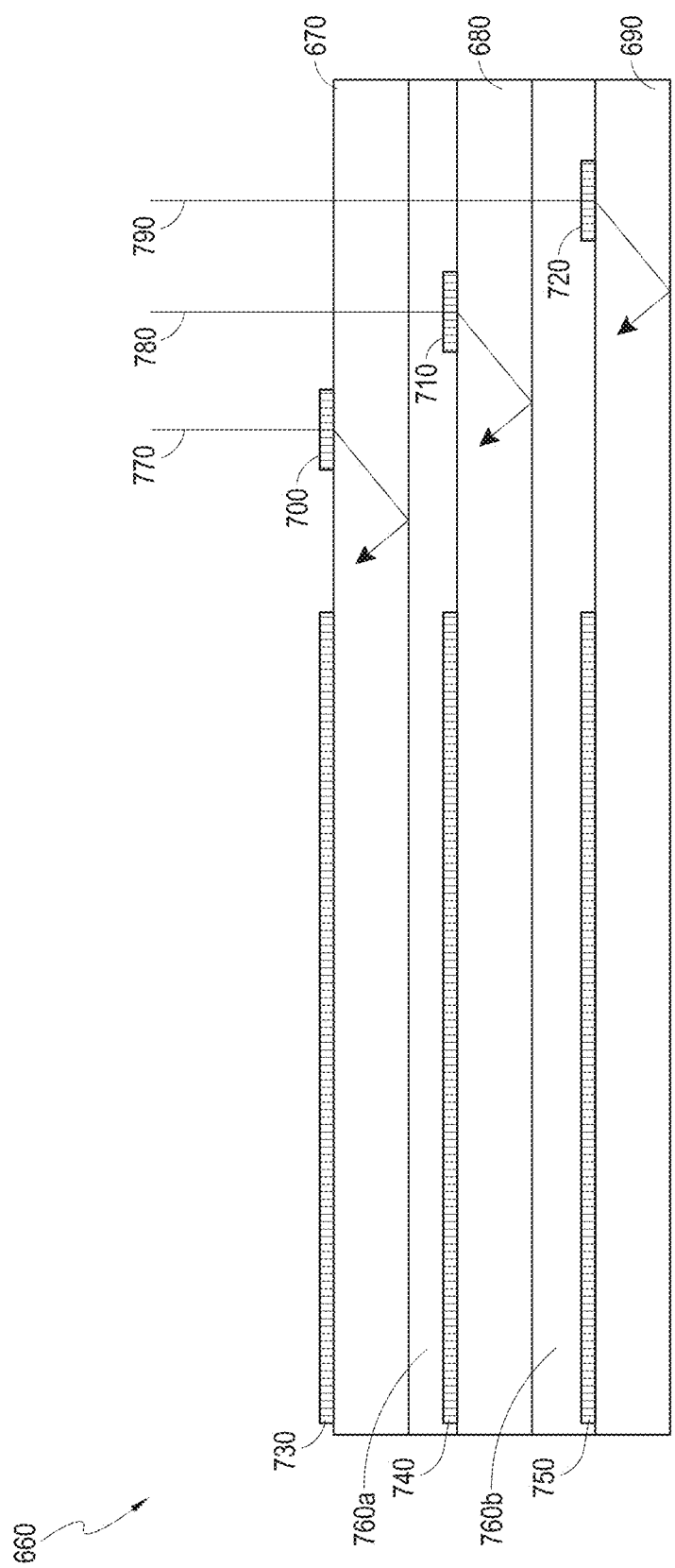
FIG. 9A illustrates a cross-sectional side view of an example of a set of stacked waveguides that each includes an in-coupling optical element.

With reference now to FIG. 9A, in some embodiments, light impinging on a waveguide may need to be redirected so as to in-couple the light into the waveguide. An in-coupling optical element may be used to redirect and in-couple the light into its corresponding waveguide. FIG. 9A illustrates a cross-sectional side view of an example of a set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position or orientation that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, for example, in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, for example, light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750 may be disposed on a bottom major surface of associated waveguides 670, 680, 690, respectively. In some other embodiments, the light distributing elements 730, 740, 750 may be disposed on both top and bottom major surface of associated waveguides 670, 680, 690 respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, for example, gas, liquid, or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). In some embodiments, the refractive index of the material forming the layers 760a, 760b is at least 0.05, or at least 0.10, less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air.

While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760*a*, 760*b* are similar or the same. In other embodiments, the material forming the waveguides 670, 680, 690 may be different between one or more waveguides, or the material forming the layers 760*a*, 760*b* may be different, while still holding to the various refractive index relationships noted above.

With continued reference to FIG. 9A, light rays 770, 780, 790 are incident on the set 660 of waveguides. Light rays 770, 780, 790 may be injected into the waveguides 670, 680, 690 by one or more image injection devices 360, 370, 380, 390, 400 (FIG. 6).

In some embodiments, the light rays 770, 780, 790 have different properties (e.g., different wavelengths or different ranges of wavelengths), which may correspond to different colors. The in-coupling optical elements 700, 710, 720 each re-direct the incident light such that the light propagates through a respective one of the waveguides 670, 680, 690 by TIR.

For example, in-coupling optical element 700 may be configured to re-direct ray 770, which has a first wavelength or range of wavelengths. Similarly, transmitted ray 780 impinges on and is re-directed by in-coupling optical element 710, which is configured to re-direct light of a second wavelength or range of wavelengths. Likewise, ray 790 is re-directed by in-coupling optical element 720, which is configured to selectively re-direct light of third wavelength or range of wavelengths.

With continued reference to FIG. 9A, light rays 770, 780, 790 are re-directed so that they propagate through a corresponding waveguide 670, 680, 690; that is, the in-coupling optical element 700, 710, 720 of each waveguide re-directs light into that corresponding waveguide 670, 680, 690 to in-couple light into that corresponding waveguide. The light rays 770, 780, 790 are re-directed at angles that cause the light to propagate through the respective waveguide 670, 680, 690 by TIR. The light rays 770, 780, 790 propagate through the respective waveguide 670, 680, 690 by TIR until interacting with the waveguide's corresponding light distributing elements 730, 740, 750.

Figure 9B:
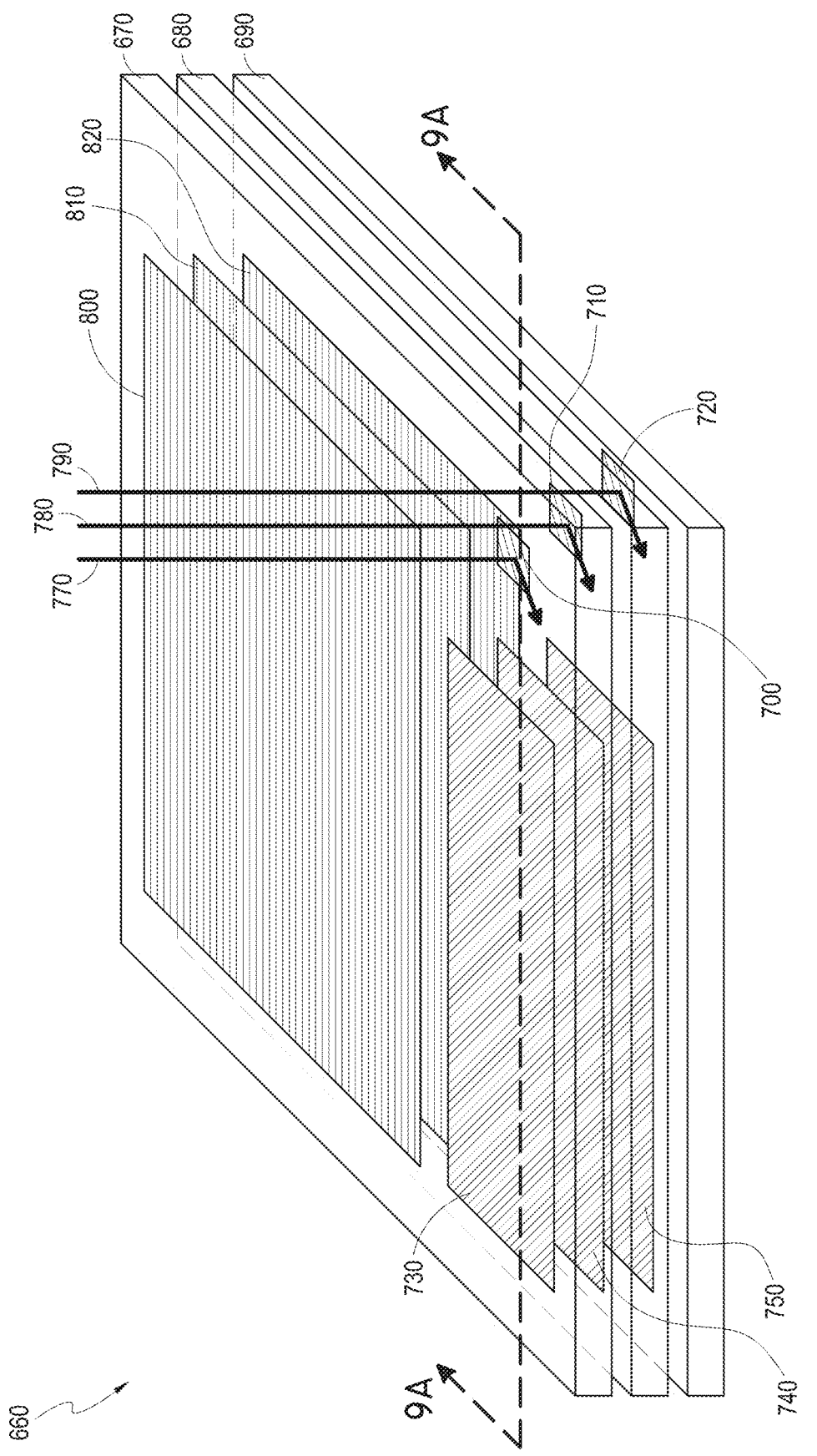
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the light rays 770, 780, 790, are in-coupled by the in-coupling optical elements 700, 710, 720, respectively, and then propagate by TIR within the waveguides 670, 680, 690, respectively. The light rays 770, 780, 790 then interact with the light distributing elements 730, 740, 750, respectively. The light distributing elements 730, 740, 750 re-direct the light rays 770, 780, 790 so that they propagate towards the out-coupling optical elements 800, 810, and 820, respectively.

In some embodiments, the light distributing elements 730, 740, 750 are orthogonal pupil expanders (OPEs). In some embodiments, the OPEs both re-direct light to the out-coupling optical elements 800, 810, 820 and also expand the pupil associated with this light by sampling the light rays 770, 780, 790 at many locations across the light distributing elements 730, 740, 750 as they propagate to the out-coupling optical elements. In some embodiments (e.g., where the exit pupil is already of a desired size), the light distributing elements 730, 740, 750 may be omitted and the in-coupling optical elements 700, 710, 720 may be configured to re-direct light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EPs) or exit pupil expanders (EPEs) that re-direct light out of the waveguides and toward a user's eye 210 (FIG. 7). The OPEs may be configured to increase the dimensions of the eye box in at least one axis and the EPEs may be configured to increase the eye box in an axis crossing (e.g., orthogonal to) the axis of the OPEs.

Accordingly, with reference to FIGS. 9A and 9B, in some embodiments, the set 660 of waveguides includes waveguides 670, 680, 690; in-coupling optical elements 700, 710, 720; light distributing elements (e.g., OPEs) 730, 740, 750; and out-coupling optical elements (e.g., EPEs) 800, 810, 820 for each component color. The waveguides 670, 680, 690 may be stacked with an air gap/cladding layer between each one. The in-coupling optical elements 700, 710, 720 direct incident light (with different in-coupling optical elements receiving light of different wavelengths) into a corresponding waveguide. The light then propagates at angles which support TIR within the respective waveguide 670, 680, 690. Since TIR only occurs for a certain range of angles, the range of propagation angles of the light rays 770, 780, 790 is limited. The range of angles which support TIR may be thought of in such an example as the angular limits of the field of view which can be displayed by the waveguides 670, 680, 690. In the example shown, light ray 770 (e.g., blue light) is in-coupled by the first in-coupling optical element 700, and then continues to reflect back and forth from the surfaces of the waveguide while traveling down the waveguide, with the light distributing element (e.g., OPE) 730 progressively sampling it to create additional replicated rays which are directed toward the out-coupling optical element (e.g., EPE) 800, in a manner described earlier. The light rays 780 and 790 (e.g., green and red light, respectively) will pass through the waveguide 670, with light ray 780 impinging on and being in-coupled by in-coupling optical element 710. The light ray 780 then propagates down the waveguide 680 via TIR, proceeding on to its light distributing element (e.g., OPE) 740 and then the out-coupling optical element (e.g., EPE) 810. Finally, light ray 790 (e.g., red light) passes through the waveguides 670, 680 to impinge on the light in-coupling optical element 720 of the waveguide 690. The light in-coupling optical element 720 in-couples the light ray 790 such that the light ray propagates to light distributing element (e.g., OPE) 750 by TIR, and then to the out-coupling optical element (e.g., EPE) 820 by TIR. The out-coupling optical element 820 then finally out-couples the light ray 790 to the user, who also receives the out-coupled light from the other waveguides 670, 680.

Figure 9C:
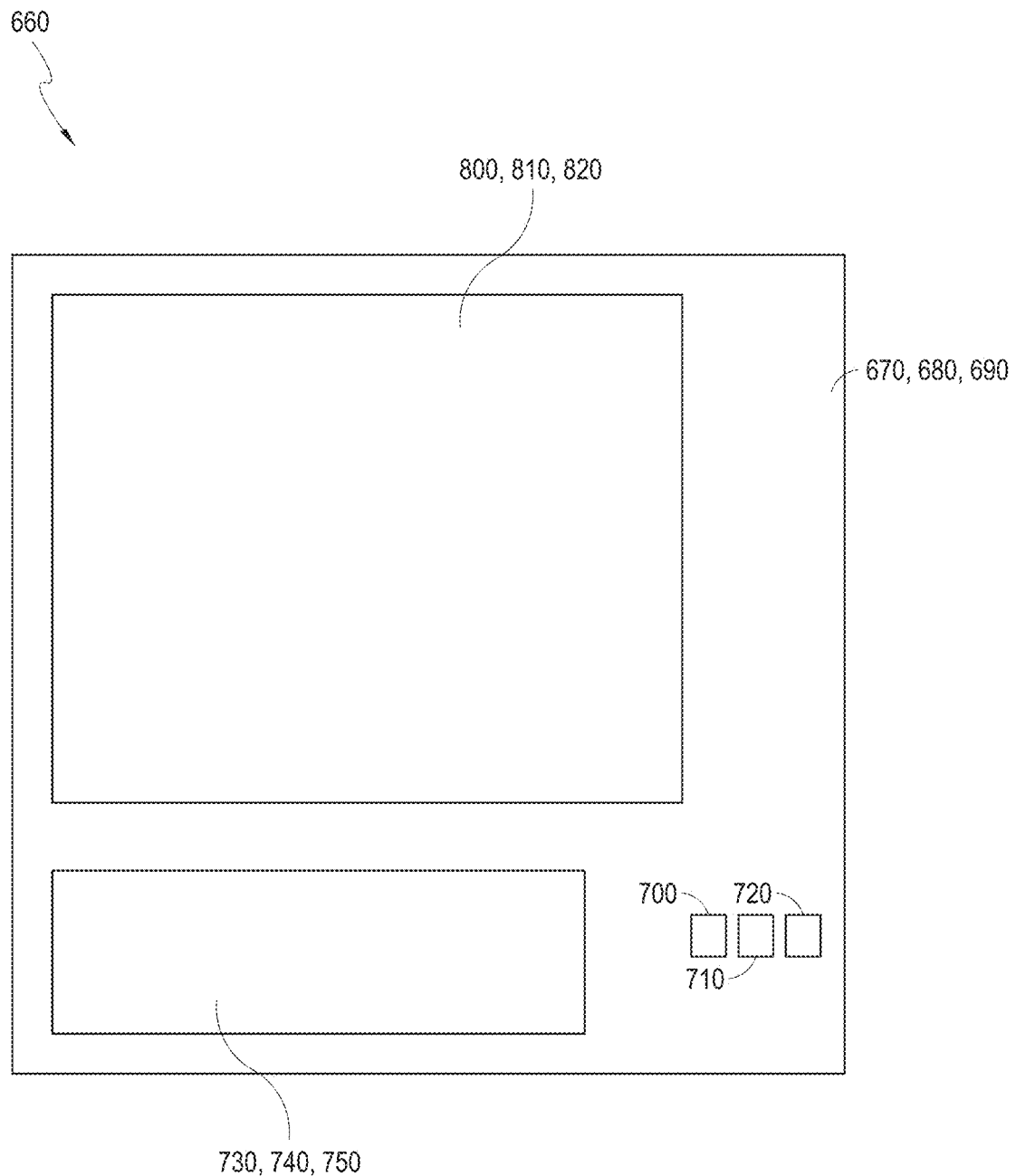
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements may be non-overlapping (e.g., laterally spaced apart as seen in the top-down view). This non-overlapping spatial arrangement may facilitate the injection of light from different sources into different waveguides on a one-to-one basis, thereby allowing a specific light source to be uniquely optically coupled to a specific waveguide. In some embodiments, arrangements including non-overlapping spatially separated in-coupling optical elements may be referred to as a shifted pupil system, and the in-coupling optical elements within these arrangements may correspond to sub pupils.

Figure 10:
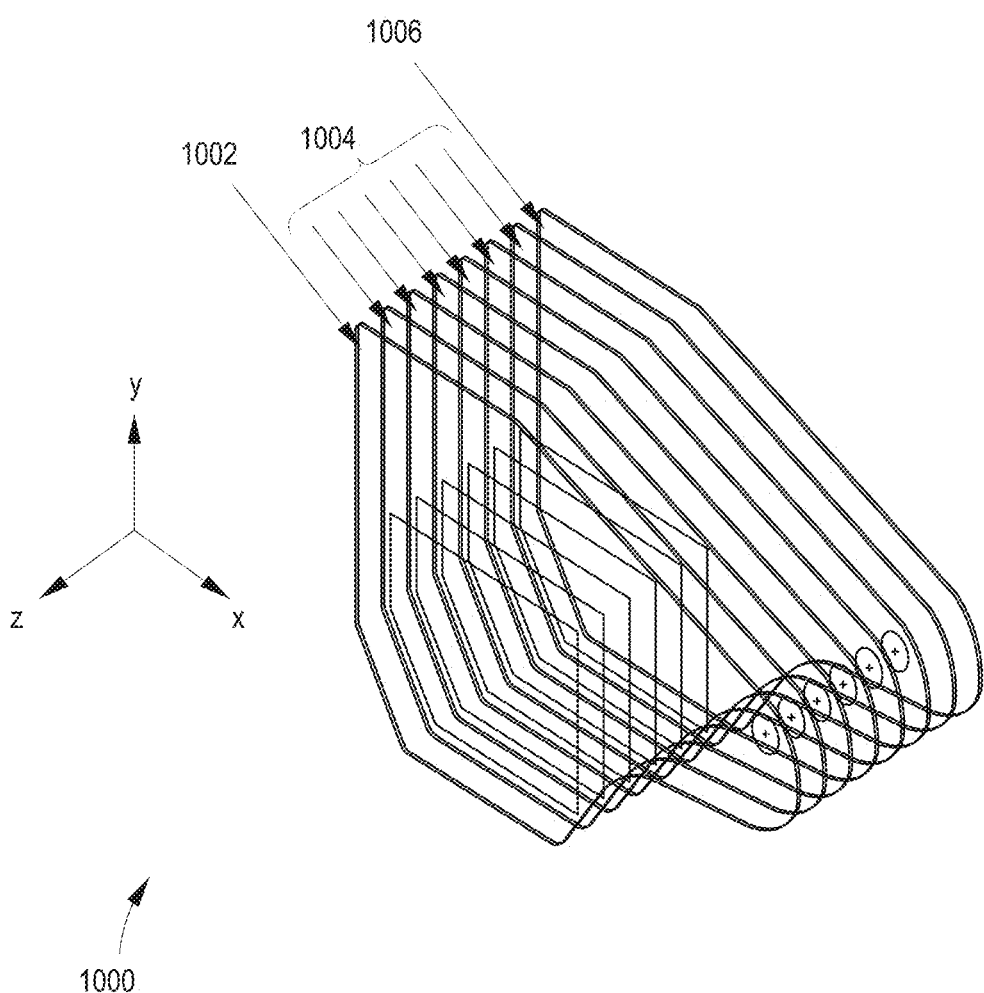
FIG. 10 is a perspective view of an example AR eyepiece waveguide stack.

FIG. 10 is a perspective view of an example AR eyepiece waveguide stack 1000. The eyepiece waveguide stack 1000 may include a world-side cover window 1002 and an eye-side cover window 1006 to protect one or more eyepiece waveguides 1004 positioned between the cover windows. In other embodiments, one or both of the cover windows 1002, 1006 may be omitted. As already discussed, the eyepiece waveguides 1004 may be arranged in a layered configuration. The eyepiece waveguides 1004 may be coupled together, for instance, with each individual eyepiece waveguide being coupled to one or more adjacent eyepiece waveguides. In some embodiments, the waveguides 1004 may be coupled together with an edge seal (such as the edge seal 1108 shown in FIG. 11) such that adjacent eyepiece waveguides 1004 are not in direct contact with each other.

Each of the eyepiece waveguides 1004 can be made of a substrate material that is at least partially transparent, such as glass, plastic, polycarbonate, sapphire, etc. The selected material may have an index of refraction above 1.4, for example, or above 1.6, or above 1.8, to facilitate light guiding. The thickness of each eyepiece waveguide substrate may be, for example, 325 microns or less, though other thicknesses can also be used. Each eyepiece waveguide can include one or more in-coupling regions, light distributing regions, image expanding regions, and out-coupling regions, which may be made up of diffractive features formed on or in each waveguide substrate 902.

Although not illustrated in FIG. 10, the eyepiece waveguide stack 1000 can include a physical support structure for supporting it in front of a user's eyes. In some embodiments, the eyepiece waveguide stack 1000 is part of a head-mounted display system 60, as illustrated in FIG. 2. In general, the eyepiece waveguide stack 1000 is supported such that an out-coupling region is directly in front of a user's eye. It should be understood that FIG. 10 illustrates only the portion of the eyepiece waveguide stack 1000 which corresponds to one of the user's eyes. A complete eyepiece may include a mirror image of the same structure, with the two halves possibly separated by a nose piece.

In some embodiments, the eyepiece waveguide stack 1000 can project color image data from multiple depth planes into the user's eyes. The image data displayed by each individual eyepiece waveguide 1004 in the eyepiece 1000 may correspond to a selected color component of the image data for a selected depth plane. For example, since the eyepiece waveguide stack 1000 includes six eyepiece waveguides 1004, it can project color image data (e.g., made up of red, green, and blue components) corresponding to two different depth planes: one eyepiece waveguide 1004 per color component per depth plane. Other embodiments can include eyepiece waveguides 1004 for more or fewer color components and/or more or fewer depth planes.

Figure 11:
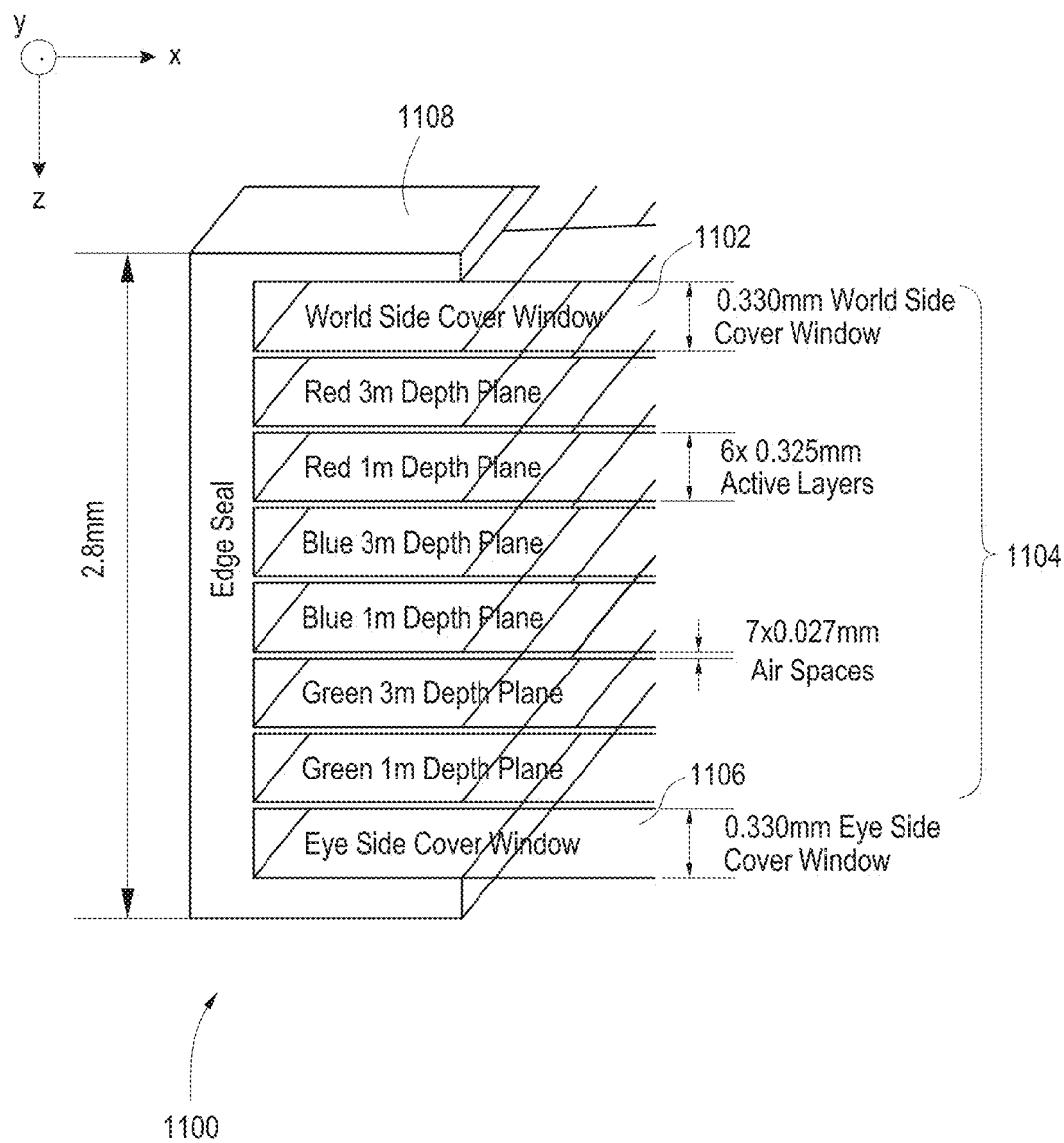
FIG. 11 is a cross-sectional view of a portion of an example eyepiece waveguide stack with an edge seal structure for supporting eyepiece waveguides in a stacked configuration.

FIG. 11 is a cross-sectional view of a portion of an example eyepiece waveguide stack 1100 with an edge seal structure 1108 for supporting eyepiece waveguides 1104 in a stacked configuration. The edge seal structure 1108 aligns the eyepiece waveguides 1104 and separates them from one another with air space or another material disposed between. Although not illustrated, the edge seal structure 1108 can extend around the entire perimeter of the stacked waveguide configuration. In FIG. 11, the separation between each eyepiece waveguide is 0.027 mm, though other distances are also possible.

In the illustrated embodiment, there are two eyepiece waveguides 1104 designed to display red image data, one for a 3 m depth plane and the other for a 1 m depth plane. (Again, the divergence of the beams of light output by an eyepiece waveguide 1104 can make the image data appear to originate from a depth plane located at a particular distance.) Similarly, there are two eyepiece waveguides 1104 designed to display blue image data, one for a 3 m depth plane and the other for a 1 m depth plane, and two eyepiece waveguides 1104 designed to display green image data, one for a 3 m depth plane and the other for a 1 m depth plane. Each of these six eyepiece waveguides 1104 is illustrated as being 0.325 mm thick, though other thicknesses are also possible.

A world-side cover window 1102 and an eye-side cover window 1106 are also shown in FIG. 11. These cover windows can be, for example, 0.330 mm thick. When accounting for the thickness of the six eyepiece waveguides 1104, the seven air gaps, the two cover windows 1102, 1106, and the edge seal 1108, the total thickness of the illustrated eyepiece waveguide stack 1100 is 2.8 mm.

Figure 12A:
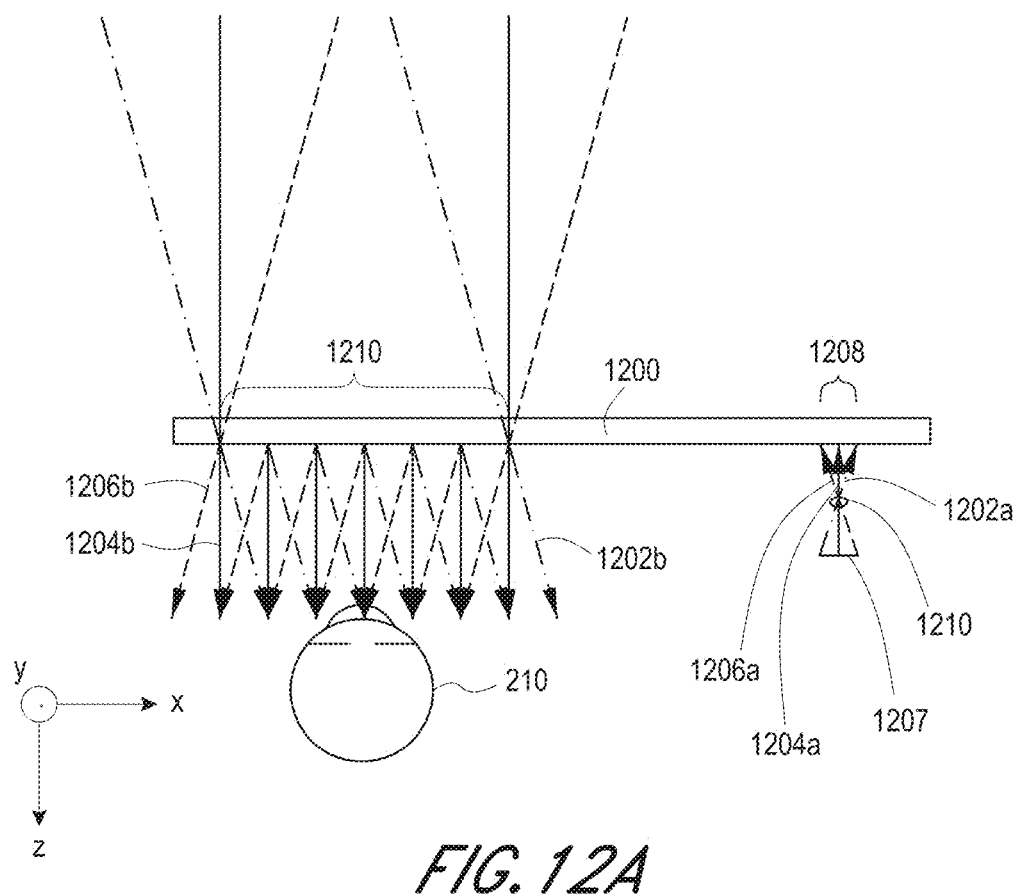
FIGS. 12A and 12B illustrate top views of an eyepiece waveguide in operation as it projects an image toward a user's eye.
Figure 12B:
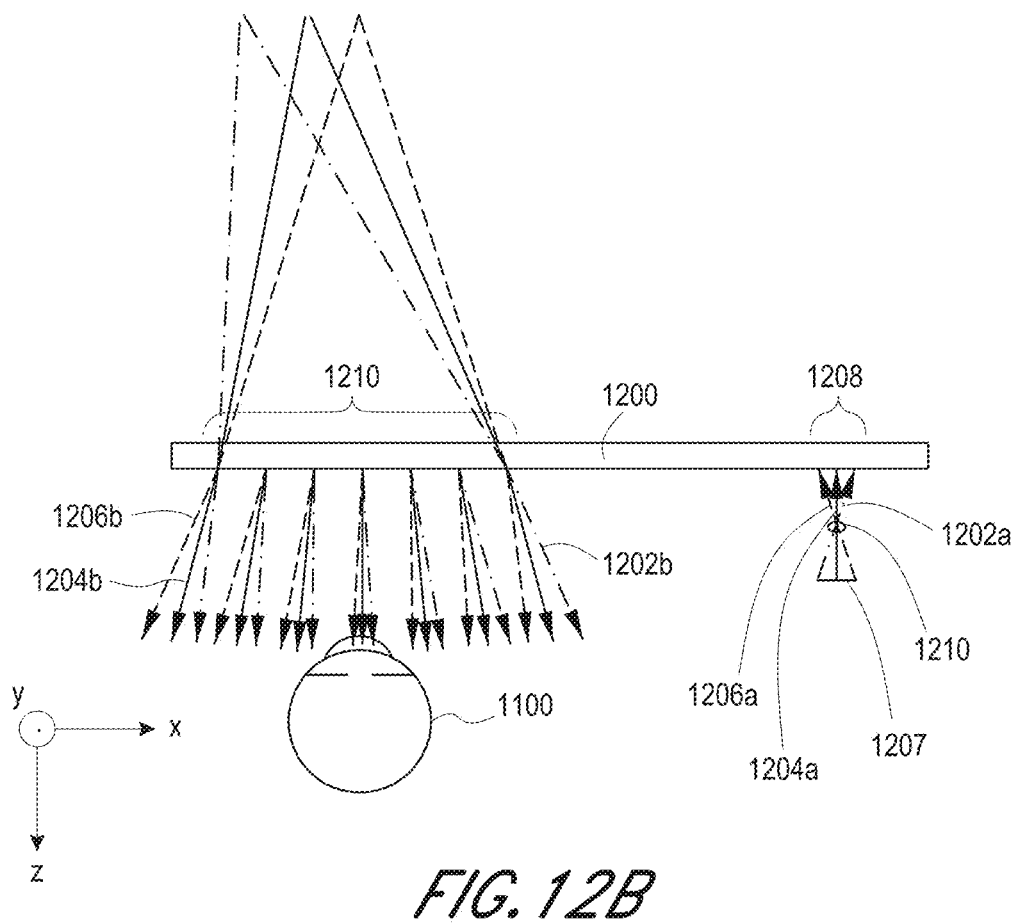

FIGS. 12A and 12B illustrate top views of an eyepiece waveguide 1200 in operation as it projects an image toward a user's eye 210. The image can first be projected from an image plane 1207 toward an entrance pupil 1208 of the eyepiece waveguide 1200 using a projection lens 1210 or some other projector device. Each image point (e.g., an image pixel or part of an image pixel) has a corresponding input beam of light (e.g., 1202a, 1204a, 1206a) which propagates in a particular direction at the entrance pupil 1208 (e.g., at a particular angle with respect to the optical axis of the projector lens 1210). Although illustrated as rays, the input beams of light 1202a, 1204a, 1206a may be, for example, collimated beams with diameters of a few millimeters or less when they enter the eyepiece waveguide 1200.

In FIGS. 12A and 12B, a middle image point corresponds to input beam 1204a, which is illustrated with a solid line. Input beam 1202a, which is illustrated with a dash-dot line, corresponds to an image point displaced to one side of the middle image point, while input beam 1206a, which is illustrated with a dashed line, corresponds to an image point displaced to the other side. For clarity of illustration, only three input beams 1202a, 1204a, 1206a are shown at the entrance pupil 1208, though a typical input image will include many input beams which correspond to different image points. And the input beams will propagate at a range of angles with respect to the optical axis, both in the x-direction and the y-direction.

There is a unique correspondence between the various propagation angles of the input beams (e.g., 1202a, 1204a, 1206a) at the entrance pupil 1208 and the respective image points at the image plane 1207. The eyepiece waveguide 1200 can be designed to in-couple the input beams (e.g., 1202a, 1204a, 1206a), replicate them in a distributed manner through space, and guide them to form an exit pupil 1210, which is larger than the entrance pupil 1208 and is made up of the replicated beams, all while substantially maintaining the correspondence between image points and beam angles. The eyepiece waveguide 1200 can convert a given input beam of light (e.g., 1202a), which propagates at a particular angle, into many replicated beams (e.g., 1202b) which are output across the exit pupil 1210 at an angle that is substantially uniquely correlated with that particular input beam and its corresponding image point. Accordingly, the eyepiece waveguide 1200 can perform pupil expansion while maintaining the relative angular relationships of the beams which make up the projected image.

As shown in FIGS. 12A and 12B, input beam of light 1204a, corresponding to the middle image point at the image plane 1207, is converted into a set of replicated output beams 1204b, shown with solid lines, which are aligned with an optical axis perpendicular to the exit pupil 1210 of the eyepiece waveguide 1200. Input beam of light 1202a is converted into a set of replicated output beams 1202b, shown with dash-dot lines, which exit the eyepiece waveguide 1200 at a propagation angle such that they appear to have originated from one side of the user's field of view, while input beam of light 1206a is converted into a set of replicated output beams 1206b, shown with dashed lines, which exit the eyepiece waveguide 1200 at a propagation angle such that they appear to have originated from the other side of the user's field of view. The greater the range of input beam angles and/or output beam angles, the greater the field of view (FOV) of the eyepiece waveguide 1200.

For each image, there are sets of replicated output beams (e.g., 1202b, 1204b, 1206b)—one set of replicated beams per image point—which are output across the exit pupil 1210 at different angles. The output beams (e.g., 1202b, 1204b, 1206b) can each be collimated. The set of output beams corresponding to a given image point may consist of beams which propagate along parallel paths (as shown in FIG. 12A) or diverging paths (as shown in FIG. 12B). In either case, the specific propagation angle of the set of replicated output beams depends on the location of the corresponding image point at the image plane 1207. FIG. 12A illustrates the case where each set of output beams (e.g., 1202b, 1204b, 1206b) consists of beams which propagate along parallel paths. This results in the image being projected so as to appear to have originated from optical infinity. This is represented in FIG. 12A by the faint lines extending from the peripheral output beams 1202b, 1204b, 1206b toward optical infinity on the world-side of the eyepiece waveguide 1200 (opposite the side where the user's eye 210 is located). FIG. 12B illustrates the case where each set of output beams (e.g., 1202b, 1204b, 1206b) consists of beams which propagate along diverging paths. This results in the image being projected so as to appear to have originated from a distance closer than optical infinity. This is represented in FIG. 12B by the faint lines extending from the peripheral output beams 1202b, 1204b, 1206b toward points on the world-side of the eyepiece waveguide 1200.

Again, each set of replicated output beams (e.g., 1202b, 1204b, 1206b) has a propagation angle that corresponds to a particular image point at the image plane 1207. In the case of a set of replicated output beams which propagate along parallel paths (see FIG. 12A), the propagation angles of all the beams are the same. In the case of a set of replicated output beams which propagate along diverging paths, however, the individual output beams can propagate at different angles, but those angles are related to one another in that they appear to have originated from a common point along the axis of the set of beams (See FIG. 12B). It is this axis which defines the angle of propagation for the set of diverging output beams and which corresponds to a particular image point at the image plane 1207.

Example Eyepiece Waveguides

Figure 13A:
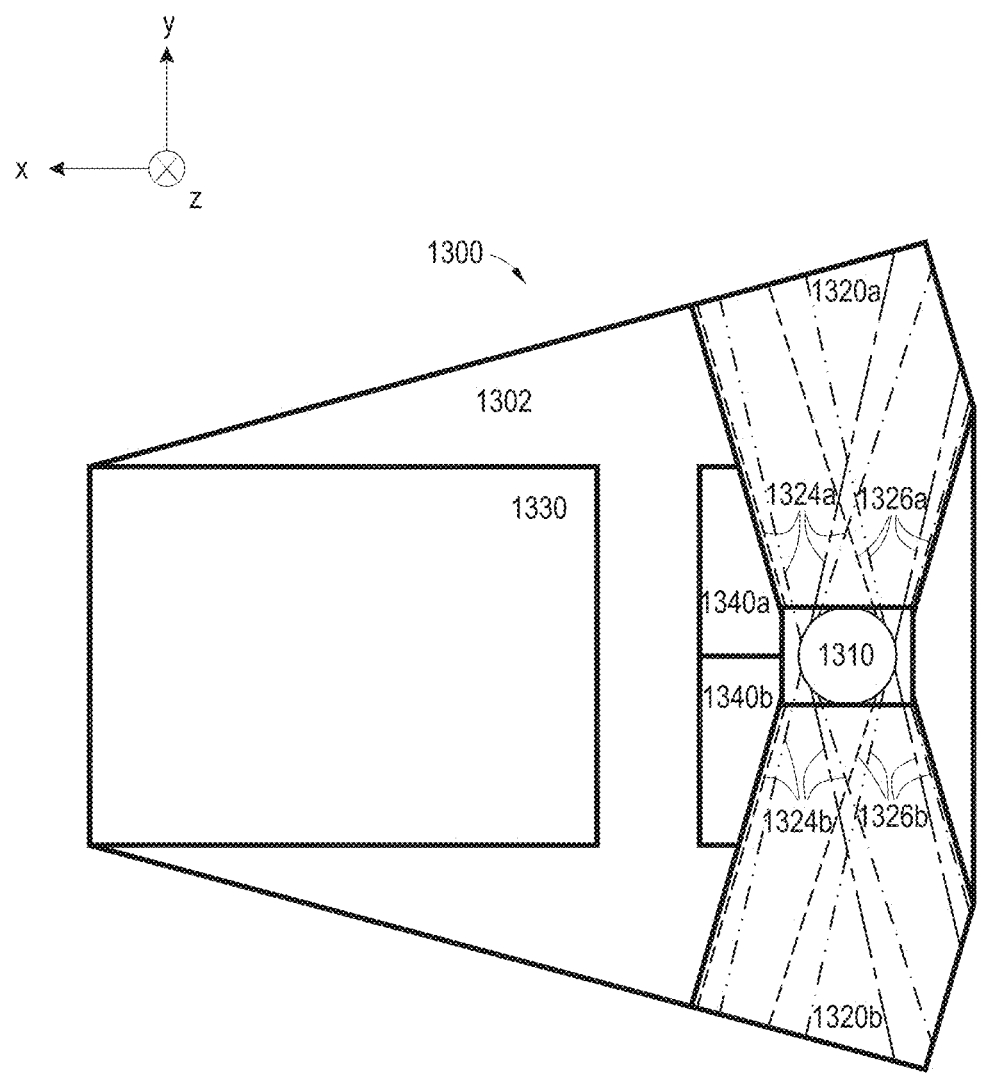
FIG. 13A illustrates a front view (in the as-worn position) of one half of an example eyepiece for a VR/AR/MR system.

FIG. 13A illustrates a front view (in the as-worn position) of one half of an example eyepiece waveguide 1300 for a VR/AR/MR system. The eyepiece waveguide 1300 can include an input coupler region 1310, an upper orthogonal pupil expander (OPE) region 1320a, a lower orthogonal pupil expander (OPE) region 1320b, and an exit pupil expander (EPE) region 1330. In some embodiments, the eyepiece waveguide 1300 can also include an upper spreader region 1340a, and a lower spreader region 1340b. The eyepiece waveguide 1300 is made of a substrate material that is at least partially transparent. For example, the eyepiece waveguide 1300 can be made of a glass, plastic, polycarbonate, sapphire, etc. substrate 1302. The selected material may have an index of refraction above 1, more preferably a relatively high index of refraction above 1.4, or more preferably above 1.6, or most preferably above 1.8 to facilitate light guiding. The thickness of the substrate 1302 may be, for example, 325 microns or less. Each of the aforementioned regions of the eyepiece waveguide 1300 can be made by forming one or more diffractive structures on or in the eyepiece waveguide substrate 1302. The specific diffractive structures may vary from region to region.

Although not illustrated in FIG. 13A, the eyepiece waveguide 1300 can include a physical support structure for supporting the eyepiece waveguide in front of a user's eyes. In some embodiments, the eyepiece waveguide 1300 is part of a head-mounted display, as illustrated in FIG. 2. In general, the eyepiece waveguide 1300 is supported such that the EPE region 1330 is directly in front of a user's eye. It should be understood that FIG. 13A illustrates only one half of the eyepiece waveguide 1300, corresponding to one of the user's eyes. A complete eyepiece waveguide typically also includes a mirror image of the same structure illustrated in FIG. 13A (e.g., with the respective input coupler regions 1310 towards the temples of the user's head and the respective EPE regions 1330 in front of the user's eyes and possibly separated by a nose piece). The two halves can be part of the same substrate 1302 or separate substrates.

As shown in FIGS. 10 and 11, in some embodiments, an eyepiece can include multiple eyepiece waveguides 1300 made of multiple substrates 1302 that are stacked together (separated by a cladding layer). Each substrate 1302 can be as illustrated in FIG. 13A and can be designed as a waveguide to project image data into the eye. In some embodiments, the image data displayed by each eyepiece waveguide 1300 in the stack corresponds to a selected color component of the image data corresponding to a selected depth plane. For example, an eyepiece that projects color image data (e.g., made up of red, green, and blue components) corresponding to three different depth planes may include a total of nine eyepiece waveguides 1300 stacked together: one eyepiece waveguide 1300 for each color component of the image data for each of three depth planes.

Figure 13B:
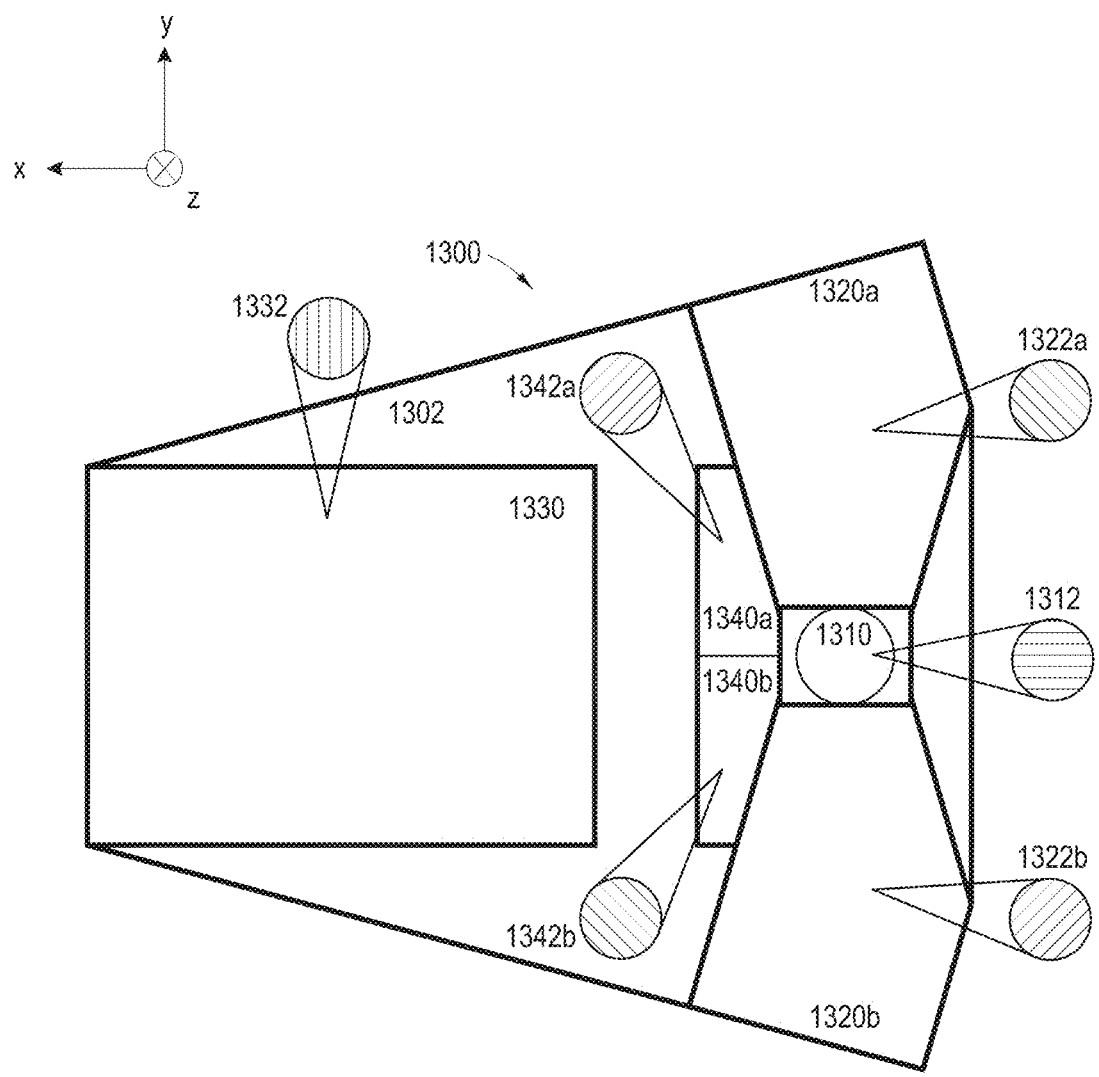
FIG. 13B illustrates some of the diffractive optical features of an eyepiece which cause image data projected into the eyepiece at an input coupler region to propagate through the eyepiece and to be projected out toward the user's eye from an exit pupil expander (EPE) region.

FIG. 13B illustrates some of the diffractive optical features of the eyepiece waveguide 1300 which cause image data projected into the eyepiece waveguide at the input coupler region 1310 to propagate through the eyepiece waveguide and to be projected out toward the user's eye from the EPE region 1330. Generally speaking, image data is projected into the eyepiece waveguide 1300 via beams of light which travel approximately in the illustrated z-direction (but the amount of angular variation may depend upon the FOV of the image data) and are incident on the input coupler region 1310 from outside of the substrate 1302. The input coupler region 1310 includes diffractive optical features which redirect the input beams of light such that they propagate inside the substrate 1302 of the eyepiece waveguide 1300 via total internal reflection. In some embodiments, the input coupler region 1310 is symmetrically located between upper and lower OPE regions 1320. The input coupler region 1310 divides and redirects the input light towards both of these OPE regions 1320.

The OPE regions 1320 include diffractive optical features which can perform at least two functions: first, they can perform pupil expansion by spatially replicating each input beam of light at many locations along the y-direction to form many spaced apart parallel beams; second, they can diffract the replicated beams of light on paths generally toward the EPE region 1330.

The EPE region 1330 likewise includes diffractive optical features which can perform at least two functions: first, they can replicate beams at many locations along another direction (e.g., a direction generally orthogonal to the one in which beams are replicated by the OPE regions 1320); second, they can diffract the beams of light coming from the OPE regions 1320 such that they exit the substrate 1302 of the eyepiece waveguide 1300 and propagate toward the user's eye. The diffractive optical features of the EPE region 1330 may also impart a degree of optical power to the exiting beams of light to make them appear as if they originate from a desired depth plane, as discussed elsewhere herein. The eyepiece waveguide 1300 can have the property that the angle of exit at which light beams are output by the EPE region 1330 is uniquely correlated with the angle of entrance of the corresponding input beam at the input coupler region 1310, thereby allowing the eye to faithfully reproduce the input image data.

The optical operation of the eyepiece waveguide 1300 will now be described in more detail. First, image data is projected into the eyepiece waveguide 1300 at the input coupler region 1310 from one or more input devices. The input device(s) can include, for example, spatial light modulator projectors (located in front of, or behind, the eyepiece waveguide 1300 with respect to the user's face). In some embodiments, the input device(s) may use liquid crystal display (LCD) technology, liquid crystal on silicon (LCoS) technology, digital light processing (DLP) technology, or fiber scanned display (FSD) technology, though others can also be used. Each input device can project one or more beams of light onto a sub-portion of the input coupler region 1310. As discussed elsewhere herein, each substrate 1302 can act as a waveguide to direct a given color component for a given depth plane of image data into the user's eye. A different sub-portion of the input coupler region 1310 can be used to input image data for each of the multiple stacked eyepiece waveguides 1300 that make up the eyepiece. This can be accomplished by, for each eyepiece waveguide 1300, providing appropriate diffractive optical features at the sub-portion of the input coupler region 1310 which has been set aside for inputting image data into the substrate 1302 of that eyepiece waveguide 1300 (e.g., as shown in FIGS. 9A-9C). For example, one substrate 1302 may have diffractive features provided in the center of its input coupler region 1310, while others may have diffractive features provided at the periphery of their respective input coupler regions at, for example, the 3 o'clock or 9 o'clock positions. Thus, the input image data intended for each eyepiece waveguide 1300 can be aimed by the projector at the corresponding sub-portion of the input coupler region 1310 such that the correct image data is coupled into the correct substrate 1302 without being coupled into the other substrates.

The projector may be provided such that the input beams of light approach the input coupler region 1310 of a substrate 1302 generally along the illustrated z-direction (though there will be some angular deviation, given that light beams corresponding to different points of an input image will be projected at different angles). The input coupler region 1310 of any given substrate 1302 includes diffractive optical features which redirect the input beams of light at appropriate angles to propagate within the substrate 1302 of the eyepiece waveguide 1300 via total internal reflection. As shown by magnified view 1312, in some embodiments the diffractive optical features of the input coupler region 1310 may form a diffraction grating made up of many lines which extend horizontally in the illustrated x-direction and periodically repeat vertically in the illustrated y-direction. In some embodiments, the lines may be etched into the substrate 1302 of the eyepiece waveguide 1300 and/or they may be formed of material deposited onto the substrate 1302. For example, the input coupler grating (ICG) may comprise lines etched into the back surface of the substrate (opposite the side where input light beams enter) and then covered with sputtered-on reflective material, such as metal. In such embodiments, the input coupler grating acts in reflection mode, though other designs can use a transmission mode. The input coupler grating can be any of several types, including a surface relief grating, binary surface relief structures, a volume holographic optical element (VHOE), a switchable polymer dispersed liquid crystal grating, etc. The period, duty cycle, depth, profile, etc. of the lines can be selected based on the wavelength of light for which the substrate is designed, the desired diffractive efficiency of the grating, and other factors.

Input light which is incident upon this input coupler diffraction grating is split and redirected both upward in the +y direction toward the upper OPE region 1320a and downward in the −y direction toward the lower OPE region 1320b. Specifically, the input light which is incident upon the diffraction grating of the input coupler region 1310 is separated into positive and negative diffractive orders, with the positive diffractive orders being directed upward toward the upper OPE region 1320a and the negative diffractive orders being directed downward toward the lower OPE region 1320b, or vice versa. In some embodiments, the diffraction grating at the input coupler region 1310 is designed to primarily couple input light into the +1 and −1 diffractive orders. (The diffraction grating can be designed so as to reduce or eliminate the $0^{th}$ diffractive order and higher diffractive orders beyond the first diffractive orders. This can be accomplished by, for example, appropriately shaping the profile of each line.)

As shown in FIG. 13A, light beams 1324a and 1324b respectively illustrate the paths along which input beams corresponding to the four corners of an input image projected at the 9 o'clock position of the input coupler region 1310 are re-directed toward the upper OPE region 1320a and the lower OPE region 1320b. Similarly, light beams 1326a and 1326b respectively illustrate the paths along which input beams corresponding to the four corners of an input image projected at the 3 o'clock position of the input coupler region 1310 are re-directed toward the upper OPE region 1320a and the lower OPE region 1320b.

The upper OPE region 1320a and the lower OPE region 1320b also include diffractive optical features. In some embodiments, these diffractive optical features are lines formed on or in the substrate 1302 of the eyepiece waveguide 1300. The period, duty cycle, depth, profile, etc. of the lines can be selected based on the wavelength of light for which the substrate is designed, the desired diffractive efficiency of the grating, and other factors. The specific shapes of the OPE regions 1320a, 1320b can vary, but in general may be determined based on what is needed to accommodate beams of light corresponding to the corners of the input image data, and all the beams of light in between, so as to provide a full view of the input image data.

As already mentioned, one purpose of these diffraction gratings in the OPE regions 1320a, 1320b is to replicate each input light beam at many spatial locations to produce multiple spaced apart parallel light beams. This can be accomplished by designing the OPE diffraction gratings to have relatively low diffractive efficiency (e.g., less than 10%) such that, with each interaction of the beam with the grating as it reflects back and forth between the front and back surfaces of the substrate 1302 via TIR, the grating re-directs (e.g., via 1st order diffraction) only a desired portion of the power of the light beam while the remaining portion continues to propagate in the same direction within the plane of the eyepiece waveguide 1300 (e.g., via 0th order diffraction). (One parameter which can be used to influence the diffractive efficiency of the grating is the etch depth of the lines.) Another purpose of the diffraction gratings in the OPE regions 1320a, 1320b is to direct those replicated light beams along paths generally toward the EPE region 1330. That is, every time a light beam interacts with the OPE diffraction grating, a portion of its power will be diffracted toward the EPE region 1330 while the remaining portion of its power will continue to transmit within the OPE region in the same direction before once again interacting with the grating, where another portion of its power is deflected toward the EPE region and so on. In this way, each input light beam is divided into multiple parallel light beams which are directed along paths generally toward the EPE region 1330. This is illustrated in FIG. 13C.

The orientation of the OPE diffraction gratings is slanted with respect to light beams arriving from the input coupler region 1310 so as to re-direct those light beams generally toward the EPE region 1330. The specific angle of the slant may depend upon the layout of the various regions of the eyepiece waveguide 1300. In the eyepiece waveguide embodiment illustrated in FIGS. 13A and 13B, the upper OPE region 1320a extends in the +y-direction, while the lower OPE region 1320b extends in the −y-direction, such that they are oriented 180° apart. Meanwhile, the EPE region 1330 is located at 90° with respect to the axis of the OPE regions 1320a, 1320b. Therefore, in order to re-direct light from the OPE regions 1320a, 1320b toward the EPE region 1330, the diffraction gratings of the OPE regions may be oriented at about +/−45° with respect to the illustrated x-axis. Specifically, as shown by magnified view 1322a, the diffraction grating of the upper OPE region 1320a may consist of lines oriented at approximately +45° to the x-axis. Meanwhile, as shown by the magnified view 1322b, the diffraction grating of the lower OPE region 1320b may consist of lines oriented at approximately −45° to the x-axis.

Figure 13C:
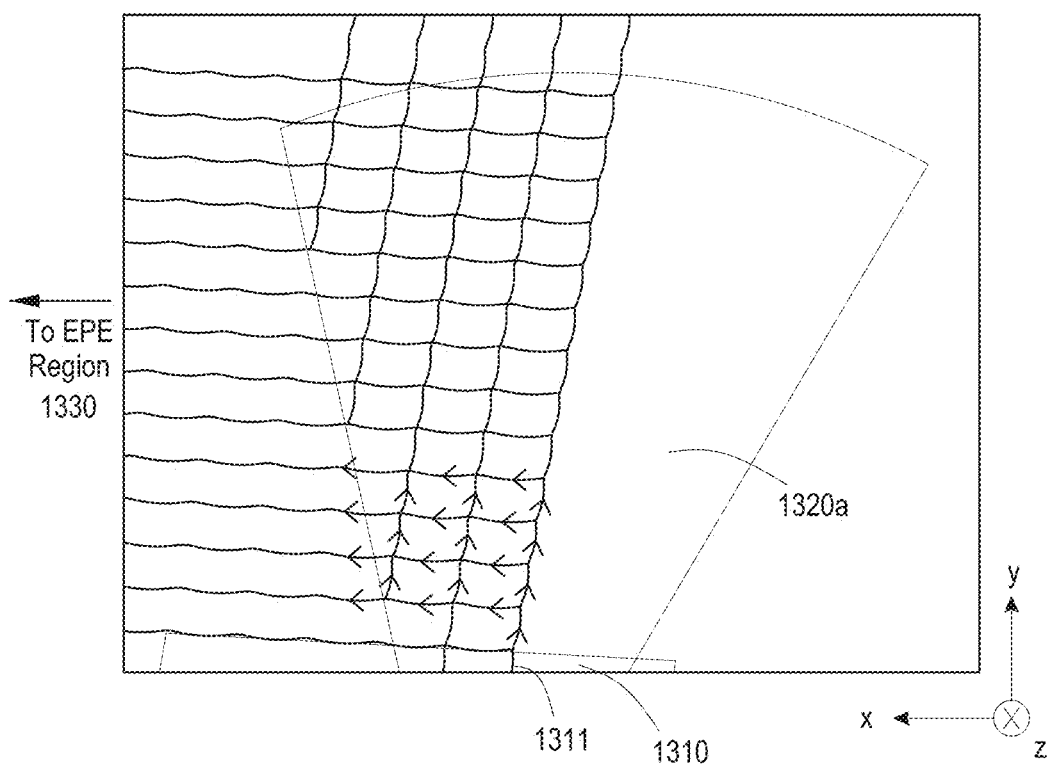
FIG. 13C illustrates the optical operation of the orthogonal pupil expander (OPE) regions shown in FIG. 9B.

FIG. 13C is a three-dimensional illustration of the optical operation of the OPE regions shown in FIG. 13B. FIG. 13C shows the input coupler region 1310 and the upper OPE region 1320a from FIG. 13B, both on the side of the substrate 1302 that is closer to the viewer. The diffractive optical features of the input coupler region 1310 and the upper OPE region 1320a cannot be seen because they are microscopic. In this case, a single input beam 1311 is illustrated, but an image will be made up of many such input beams propagating through the eyepiece waveguide 1300 at slightly different angles. The input beam 1311 enters the upper OPE region 1320a from the input coupler region 1310. The input beam 1311 then continues to propagate through the eyepiece waveguide 1300 via total internal reflection, repeatedly reflecting back and forth between its surfaces. This is represented in FIG. 13C by the zig-zagging in the illustrated propagation of each beam.

When the input beam 1311 interacts with the diffraction grating formed in the upper OPE region 1320a, a portion of its power is diffracted toward the EPE region 1330, while another portion of its power continues along the same path through the upper OPE region 1320a. As already mentioned, this is due in part to the relatively low diffractive efficiency of the grating. Further, beams diffracted toward the EPE region 1330 may re-encounter the grating of the upper OPE region 1320a and portions of their power may diffract back into the original direction of propagation of the input beam 1311, while other portions of their power may continue on toward the EPE region. The paths of some of these beams are indicated in FIG. 13C by arrows. The effect is that the spatial extent of the light is expanded since the input beam is replicated at many locations as it propagates through the upper OPE region 1320a. This is evident from FIG. 13C, which shows that the input beam 1311 is replicated into many light beams ultimately traveling generally in the x-direction toward the EPE region 1330.

With reference back to FIG. 13B, it is advantageous that the input coupler region 1310 be located between two OPE regions because this allows the eyepiece waveguide 1300 to efficiently make use of light diffracted into the positive and negative diffractive order(s) at the input coupler region 1310, as one OPE region receives one or more positive diffractive order(s) and the other OPE region receives one or more negative diffractive order(s) from the input coupler region 1310. The light from the positive and negative diffractive orders can then be recombined at the EPE region 1330 and out-coupled to the user's eye. Although the position of the input coupler region 1310 between the upper and lower OPE regions 1320a, 1320b is advantageous in this regard, it can result in the input coupler region 1310 effectively shadowing the central portion of the EPE region 1330. That is, because input beams are separated into positive and negative diffractive orders by the input coupler and are first directed in the +y direction or the −y direction before being re-directed in the +x direction toward the EPE region 1330, fewer light beams may reach the central portion of the EPE region which is located directly to the left of the input coupler region 1310 in FIGS. 13A and 13B. This may be undesirable because if the center of the EPE region 1330 is aligned with the user's eye, then fewer light beams may ultimately be directed to the user's eye from the central portion of the EPE region 1330 due to this shadowing effect which is caused by the position of the input coupler region 1310 between the OPE regions 1320. As a solution to this, the eyepiece waveguide 1300 can also include upper and lower spreader regions 1340a, 1340b. These spreader regions can re-direct light beams from the OPE regions so as to fill in the central portion of the EPE region 1330. The upper and lower spreader regions 1340a, 1340b accomplish this task with diffractive features which are illustrated in FIG. 13B.

As shown in magnified view 1342a, the upper spreader region 1340a can include a diffraction grating whose grating lines are formed at approximately −45° to the x-axis, generally orthogonal to the grating lines in the neighboring upper OPE region 1320a from which the upper spreader region 1340a primarily receives light Like the OPE gratings, the efficiency of the gratings in the spreader regions can be designed such that only a portion of the power of each light beam is re-directed during each interaction with the grating. Due to the orientation of the diffraction grating lines in the upper spreader region 1340a, light beams from the upper OPE region 1320a are re-directed somewhat in the −y-direction before continuing on in the +x-direction toward the EPE region 1330. Thus, the upper spreader region 1340a helps to increase the number of light beams which reach the central portion of the EPE region 1330, notwithstanding any shadowing caused by the position of the input coupler region 1310 with respect to the EPE region 1330. Similarly, as shown in magnified view 1342b, the lower spreader region 1340b can include grating lines which are formed at approximately +45° to the x-axis, generally orthogonal to the grating lines in the neighboring lower OPE region 1320b from which the lower spreader region 1340b primarily receives light. The diffraction grating lines in the lower spreader region 1340b cause light beams from the lower OPE region 1320b to be re-directed somewhat in the +y direction before continuing on in the +x direction toward the EPE region 1330. Thus, the lower spreader region 1340b also helps to increase the number of light beams which reach the central portion of the EPE region 1330.

Light beams from the OPE regions 1320a, 1320b and the spreader regions 1340a, 1340b propagate through the substrate 1302 of the eyepiece waveguide 1300 until ultimately reaching the EPE region 1330. The EPE region 1330 can include diffractive optical features which re-direct the light beams out of the eyepiece waveguide 1300 and toward the user's eye. As shown in magnified view 1332, the diffractive optical features of the EPE region 1330 can be vertical grating lines which extend in the y-direction and exhibit periodicity in the x-direction. Alternatively, as shown in FIG. 14, the lines of the diffraction grating in the EPE region 1330 can be somewhat curved in order to impart optical power to the image data. The period, duty cycle, depth, profile, etc. of the lines can be selected based on the wavelength of light for which the substrate is designed, the desired diffractive efficiency of the grating, and other factors. A portion of the power of each light beam is re-directed out of the substrate 1302 of the eyepiece waveguide 1300 as a result of each interaction with the grating in the EPE region 1330. The specific angle at which each output beam exits the EPE region 1330 of the eyepiece waveguide 1300 is determined by the angle of incidence of the corresponding input beam at the input coupler region 1310.

Figure 14A:
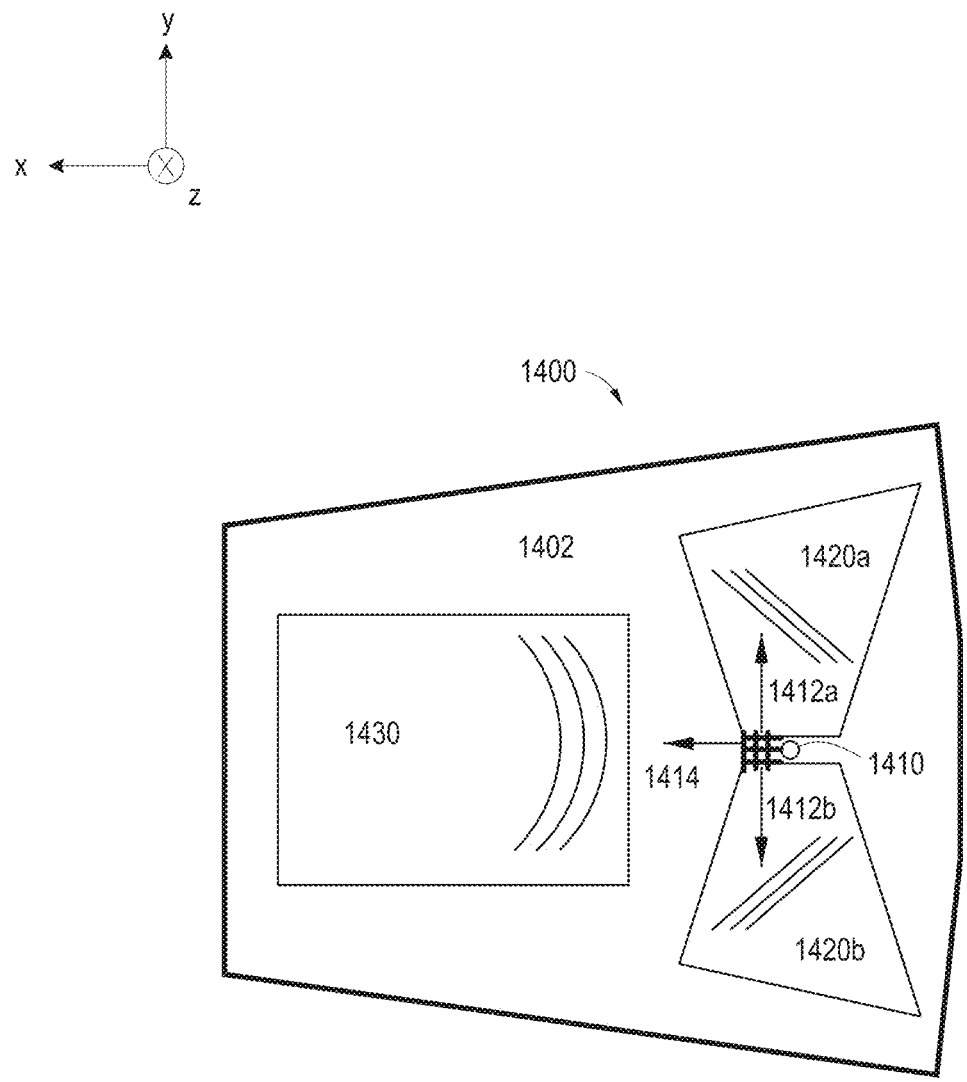
FIG. 14A illustrates an embodiment of an eyepiece which includes an input coupler region having a crossed diffraction grating.

FIG. 14A illustrates an embodiment of an eyepiece waveguide 1400 which includes an input coupler region 1410 with a crossed diffraction grating. The eyepiece waveguide 1400 is formed of a substrate 1402 and includes the input coupler region 1410, an upper OPE region 1420a, a lower OPE region 1420b, and an EPE region 1430. Except where noted otherwise, the eyepiece waveguide 1400 shown in FIG. 14 can function similarly to the eyepiece waveguide 1300 illustrated in FIGS. 13A-13C. The design of the eyepiece waveguide 1400 represents another way to increase the amount of light that is directed toward the central portion of the EPE region 1430 (located directly to the left of the input coupler region 1410) without necessarily using the types of spreader regions 1340a, 1340b discussed with respect to FIGS. 13A-13C.

A principal difference between the eyepiece waveguide 1400 in FIG. 14A, as compared to the eyepiece waveguide 1300 in FIGS. 13A-13C, is the design of the input coupler region 1410. In the eyepiece waveguide 1300 shown in FIGS. 13A-13C, the input coupler region 1310 was designed so as to re-direct input light primarily only to the upper and lower OPE regions 1320a, 1320b. In contrast, the input coupler region 1410 shown in FIG. 14A is designed to direct input light both to the upper and lower OPE regions 1420a, 1420b and directly to the EPE region 1430. This can be accomplished by using a crossed diffraction grating in the input coupler region 1410.

Figure 14B:
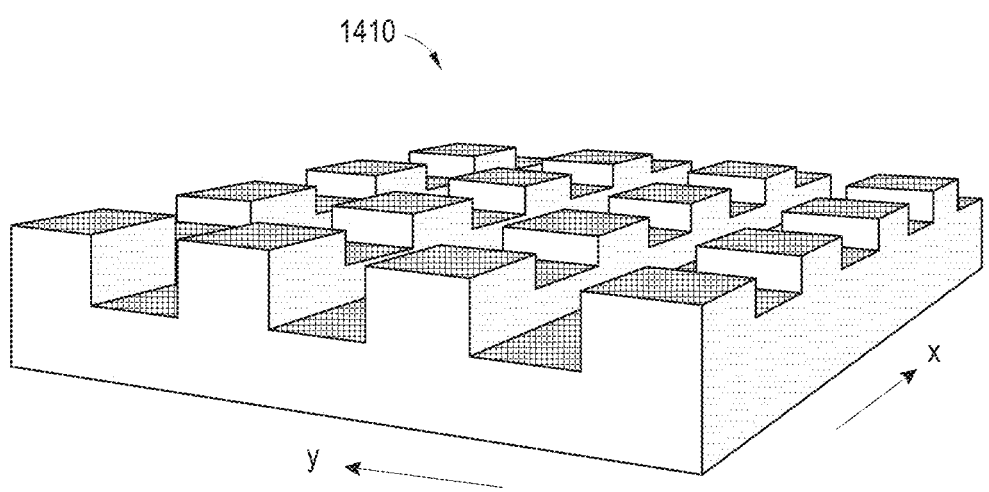
FIG. 14B is a perspective view of an example embodiment of the input coupler region shown in FIG. 14A made up of a crossed diffraction grating.

FIG. 14B is a perspective view of an example embodiment of the input coupler region 1410 made up of a crossed diffraction grating. The crossed grating can be thought of as the superposition of two diffraction gratings with different orientations. The first diffraction grating can be formed similarly to the one illustrated with respect to FIGS. 13A-13C. Namely, it can consist of lines extending in the x-direction and repeating periodically in the y-direction. This first diffraction grating splits input light into positive and negative diffractive orders which are respectively directed toward the upper and lower OPE regions 1420a, 1420b. The first diffraction grating can have a first diffractive efficiency to control the proportion of the power of the input light which it re-directs toward the OPE regions 1420a, 1420b.

The second diffraction grating can consist of lines extending in the y-direction and repeating periodically in the x-direction. In other words, the second diffraction grating can be oriented at approximately 90° to the first diffraction grating. This orientation of the second diffraction grating causes input beams of light to be re-directed toward the EPE region 1430, which in this embodiment is located in a direction substantially 90° from the directions in which the OPE regions 1420a, 1420b are located with respect to the input coupler region 1410, without first passing through the OPE regions. (The second diffraction grating could also have other orientations depending on the direction in which the EPE region 1430 is located in other embodiments.) The second diffraction grating can be designed to have a second diffractive efficiency which may be different from that of the first diffraction grating. In some embodiments, the second diffraction grating can be designed to be less efficient than the first diffraction grating. (This can be accomplished by, for example, making the lines of the second diffraction grating shallower than those of the first diffraction grating, as shown in FIG. 14B.) Thus, most of the power of the input light is re-directed toward the upper and lower OPE regions 1420a, 1420b by the first diffraction grating (represented by light beams 1412a, 1412b), while a lesser portion of the power of the input light is re-directed directly toward the EPE region 1430 by the second diffraction grating (represented by light beam 1414). Because the input coupler region 1410 re-directs some of the power of the input light directly toward the EPE region 1430, such that it does not first pass through the OPE regions 1420, the aforementioned shadowing of the central portion of the EPE region by the input coupler region can be reduced.

Figure 15A:
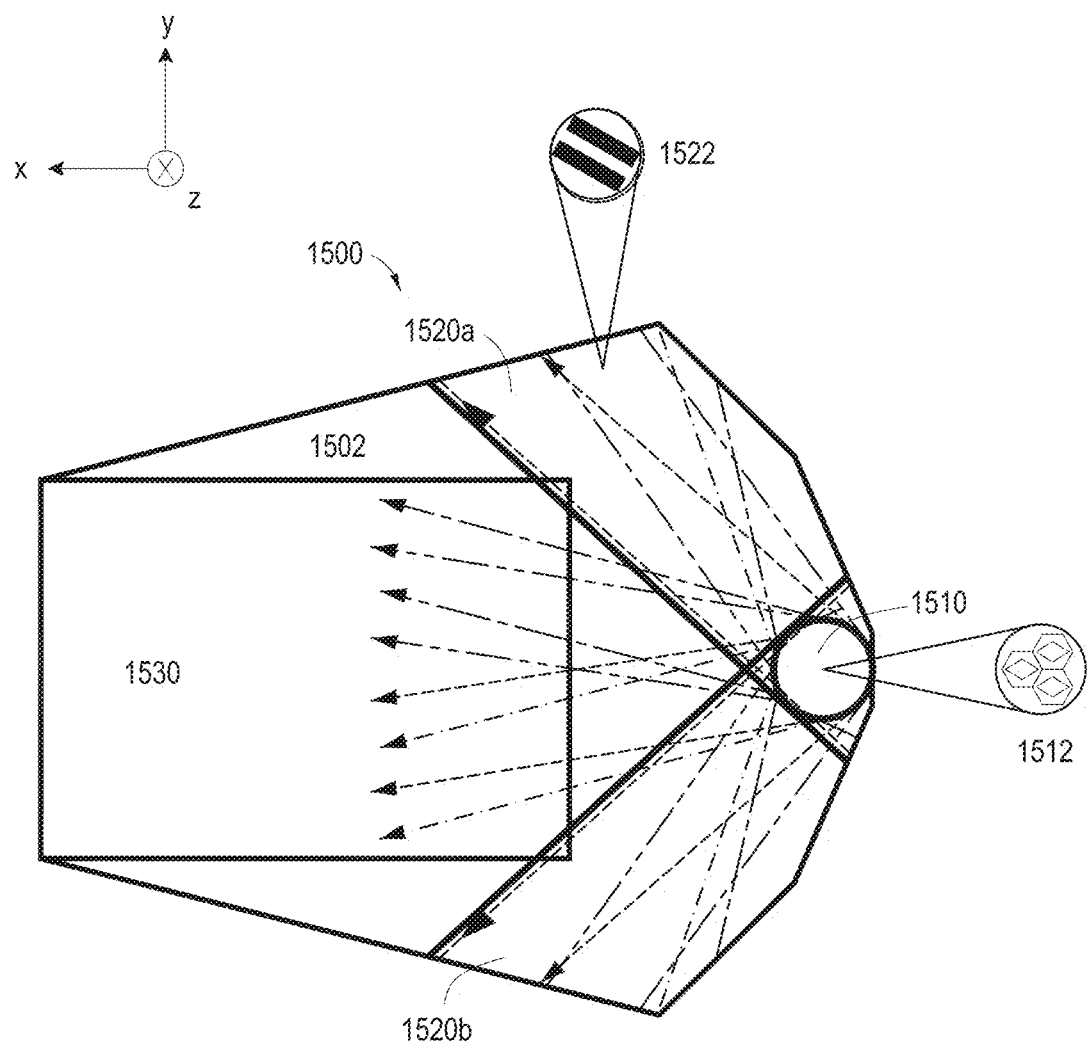
FIG. 15A illustrates an embodiment of an eyepiece with upper and lower OPE regions which are angled toward an EPE region to provide a more compact form factor.

FIG. 15A illustrates an embodiment of an eyepiece waveguide 1500 with upper and lower OPE regions which are angled toward the EPE region 1530 to provide a more compact form factor. The eyepiece waveguide 1500 is formed of a substrate 1502 and includes an input coupler region 1510, an upper OPE region 1520a, a lower OPE region 1520b, and an EPE region 1530. Except where noted otherwise, the eyepiece waveguide 1500 shown in FIG. 15A can function similarly to the eyepiece waveguide 1300 illustrated in FIGS. 13A-13C.

A principal difference between the eyepiece waveguide 1500 in FIG. 15A, as compared to the eyepiece waveguide 1300 in FIGS. 13A-13C, is that the OPE regions 1520a, 1520b are angled toward the EPE region 1530. In the embodiment shown in FIG. 15A, each OPE region is tilted from the y-axis by about 30°. Thus, rather than being separated by about 180°, as in the embodiment illustrated in FIGS. 13A-13B, the upper OPE region 1520a and the lower OPE region 1520b are separated by about 120°. While the precise amount of angling of the OPE regions 1520a, 1520b toward the EPE region can vary (e.g., up to 60°), in general such angling may allow the eyepiece waveguide 1500 to achieve a more compact design. This can be advantageous because it may allow the head-mounted display of a VR/AR/MR system to be made less bulky.

The design of the diffractive features in the input coupler region 1510 can be changed to so as to match the angles at which input beams of light are launched into the substrate 1502 of the eyepiece waveguide 1500 such that they correspond with the directions in which the OPE regions 1520a, 1520b are located with respect to the input coupler region 1510. An example embodiment of the diffractive features of the input coupler region 1510 is shown in the magnified view 1512 in FIG. 15B.

Figure 15B:
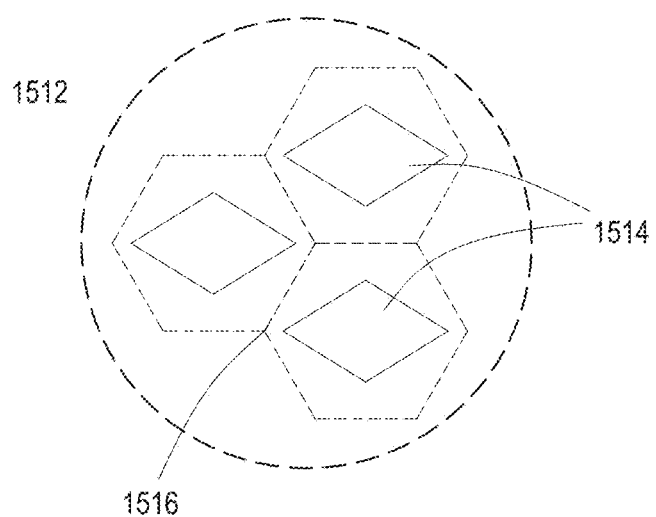
FIG. 15B illustrates an example embodiment of the diffractive optical features of the input coupler region of the eyepiece shown in FIG. 15A.

FIG. 15B illustrates an example embodiment of the diffractive optical features of the input coupler region 1510 of the eyepiece waveguide 1500 shown in FIG. 15A. In the illustrated embodiment, the input coupler region 1510 has a plurality of diffractive features, or light scattering features, 1514 (e.g., indentations, protrusions, etc.) laid out in a hexagonal lattice 1516. (Note: the dotted lines around each diffractive feature 1514 are intended to illustrate the hexagonal lattice 1516, not necessarily to correspond to any physical structure along the dotted lines.) The hexagonal lattice 1516 of the diffractive features causes the input beams of light that are incident on the input coupler region to be launched into the substrate 1502 of the eyepiece waveguide 1500 in multiple directions at 60° intervals. Thus, as shown in FIG. 15A, a first set of input beams are launched towards the upper OPE region 1520a at approximately 60° to the x-axis, a second set of input beams are launched toward the lower OPE region 1520b at approximately −60° to the x-axis, and a third set of input beams are launched directly toward the EPE region 1530 generally along the x-axis. Other tessellated configurations can also be used, depending on the shape of the eyepiece waveguide 1500 and the direction(s) from the input coupler region 1510 to the OPE region(s). The specific shape of the diffractive features 1514 determines the efficiency with which light is re-directed into each of these directions. In the illustrated embodiment, each of the diffractive features 1514 is a rhombus, but other shapes are also possible. In addition, the diffractive features 1514 can be single or multi-leveled.

In some embodiments, the diffractive features of the input coupler region 1510 are etched into the back surface of the substrate 1502 (on the opposite side from where input beams enter the substrate 1502 from an input device). The etched diffractive features on the back surface of the substrate 1502 can then be coated with a reflective material. In this way, input beams of light enter the front surface of the substrate and diffract from the diffractive features on the back surface such that the diffractive features operate in a reflection mode. The upper OPE region 1520a and the lower OPE region 1520b also include diffractive optical features as before. The diffractive features of the upper OPE region 1520a are illustrated in magnified view 1522 in FIG. 15C.

Figure 15C:
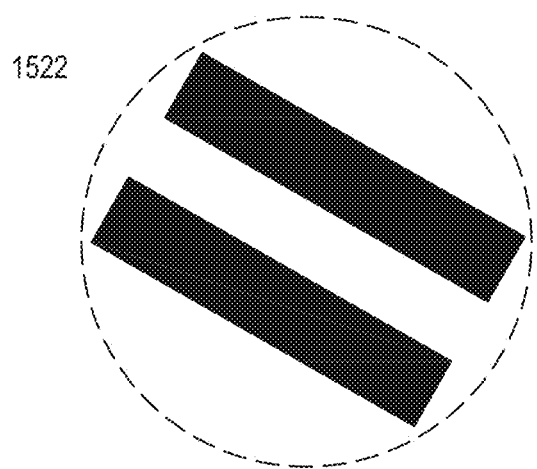
FIG. 15C illustrates an example embodiment of the diffractive optical features of the OPE region of the eyepiece shown in FIG. 15A.

FIG. 15C illustrates an example embodiment of the diffractive optical features of the OPE region 1520a of the eyepiece waveguide 1500 shown in FIG. 15A. As was the case with the diffractive features of the OPE regions in the eyepiece waveguide 1300 shown in FIGS. 13A and 13B, the diffractive features of the OPE regions 1520a, 1520b of the eyepiece waveguide 1500 shown in FIG. 15A are likewise a periodically repeating pattern of lines which form a diffraction grating. In this case, however, the angle at which the lines are oriented has been adjusted in view of the slanted orientation of the OPE region 1520a so as to still re-direct beams of light toward the EPE region 1530. Specifically, the lines of the diffraction grating in the upper OPE region 1520a are oriented at approximately +30° with respect to the x-axis. Similarly, the lines of the diffraction grating in the lower OPE region 1520b are oriented at approximately −30° with respect to the x-axis.

ADDITIONAL CONSIDERATIONS

Unless the context clearly requires otherwise, throughout the description and the claims, the words "comprise," "comprising," "include," "including," "have" and "having" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Depending on the context, "coupled" or "connected" may refer to an optical coupling or optical connection such that light is coupled or connected from one optical element to another optical element. Additionally, the words "herein," "above," "below," "infra," "supra," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items is an inclusive (rather than an exclusive) "or", and "or" covers all of the following interpretations of the word: any of the items in the list, all of the items in the list, and any combination of one or more of the items in the list, and does not exclude other items being added to the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, and/or states are in any way required for one or more embodiments or whether these features, elements, and/or states are included or are to be performed in any particular embodiment.

Unless stated or illustrated otherwise, or evident to a person of ordinary skill in the art from context, words like "about," "approximately," and "generally" used in connection with a stated value or other descriptor can be understood to indicate a range of ±20% around the stated value.

While certain embodiments have been described, these embodiments have been presented by way of example only, and are not intended to limit the scope of the disclosure. Features of any one of the embodiments can be combined and/or substituted with features of any other one of the embodiments. Certain advantages of various embodiments have been described herein. But not all embodiments necessarily achieve each of these advantages.

Embodiments have been described in connection with the accompanying drawings. However, the figures are not drawn to scale. Distances, angles, etc. are merely illustrative and do not necessarily bear an exact relationship to actual dimensions and layout of the devices illustrated.

The foregoing embodiments have been described at a level of detail to allow one of ordinary skill in the art to make and use the devices, systems, methods, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

What is claimed is:

1. An eyepiece for a virtual reality, augmented reality, or mixed reality system, the eyepiece comprising:
   first and second waveguide substrates that are at least partially transparent;
   an input coupler grating formed on or in each of the first and second waveguide substrates and configured to couple at least one respective input light beam that is externally incident on the input coupler grating into at least a respective first guided light beam that propagates inside the respective first and second waveguide substrates;
   a first orthogonal pupil expander (OPE) grating formed on or in each of the first and second waveguide substrates and configured to divide the respective first guided light beam from the respective input coupler grating into a respective plurality of parallel, spaced-apart light beams; and
   an exit pupil expander (EPE) grating formed on or in each of the first and second waveguide substrates and configured to re-direct the respective light beams from the respective first OPE grating such that they exit the respective first and second waveguide substrates, the EPE grating comprising a plurality of curved lines whose curvature determines an amount of optical power of the EPE grating,
   wherein the first and second waveguide substrates are configured to respectively output a plurality of output beams such that they correspond to different respective first and second depth planes, the first and second depth planes being determined by the respective optical powers of the EPE grating of the first waveguide substrate and the EPE grating of the second waveguide substrate, the EPE grating of the second waveguide substrate comprising an amount of optical power that is different than the optical power of the EPE grating of the first waveguide substrate.

2. The eyepiece of claim 1, wherein the first waveguide substrate is less than 325 microns thick.

3. The eyepiece of claim 1, wherein the first waveguide substrate comprises glass, plastic, or polycarbonate.

4. The eyepiece of claim 1, wherein the first waveguide substrate is configured to project a color component of image data.

5. The eyepiece of claim 1, further comprising a projector to direct light toward the input coupler grating of the first waveguide substrate and toward the input coupler grating of the second waveguide substrate.

6. The eyepiece of claim 1, wherein the input coupler grating is configured to divide and re-direct the at least one input light beam that is externally incident on the input coupler grating into first and second guided light beams that propagate inside the first waveguide substrate, the first eyepiece waveguide further comprising:
   a second OPE grating formed on or in the substrate and configured to divide the second guided light beam from the input coupler grating into a plurality of parallel, spaced-apart light beams,
   wherein the EPE grating is configured to re-direct the light beams from the first and second OPE gratings such that they exit the first waveguide substrate, and
   wherein the input coupler grating is positioned between the first OPE grating and the second OPE grating and is configured to direct the first guided light beam toward the first OPE grating and to direct the second guided light beam toward the second OPE grating.

7. The eyepiece of claim 6, wherein the input coupler grating is configured to separate the input light beam into a +1 diffractive order directed toward the first OPE grating and a −1 diffractive order directed toward the second OPE grating.

8. The eyepiece of claim 6, wherein the first and second OPE gratings are separated by approximately 180° and the EPE grating is located at about 90° to both OPE gratings.

9. The eyepiece of claim 6, wherein the first and second OPE gratings are slanted toward the EPE grating.

10. The eyepiece of claim 9, wherein the first and second OPE gratings are separated by approximately 120° and the EPE grating is located at about 60° to both OPE gratings.

11. The eyepiece of claim 6, wherein the input coupler grating comprises diffractive optical features to divide and redirect the input light beam toward the first and second OPE gratings.

12. The eyepiece of claim 11, wherein the diffractive optical features of the input coupler grating comprise a plurality of lines forming at least one diffraction grating.

13. The eyepiece of claim 11, wherein the diffractive optical features of the input coupler grating comprise a plurality of features laid out on in a lattice pattern.

14. The eyepiece of claim 13, wherein the lattice pattern comprises a hexagonal lattice.

15. The eyepiece of claim 11, wherein the diffractive optical features of the input coupler grating comprise a crossed grating.

16. The eyepiece of claim 11, wherein the diffractive optical features of the input coupler grating are configured to direct light toward the first and second OPE gratings, and toward the EPE grating without first passing through either of the OPE gratings.

17. The eyepiece of claim 6, wherein the first and second OPE gratings comprise diffractive optical features to divide each of the first and second guided light beams into the plurality of parallel, spaced-apart light beams.

18. The eyepiece of claim 17, wherein the diffractive optical features of the first and second OPE gratings comprise a plurality of lines forming diffraction gratings.

19. The eyepiece of claim 18, wherein the diffraction gratings of the first and second OPE gratings are angled so as to direct the plurality of spaced-apart light beams toward the EPE grating.

20. The eyepiece of claim 6, wherein the first waveguide substrate further comprises:

a first spreader grating that receives the light beams from the first OPE grating and spreads their distribution so as to reach a larger portion of the EPE grating; and a second spreader grating that receives the light beams from the second OPE grating and spreads their distribution so as to reach a larger portion of the EPE grating.

21. The eyepiece of claim 20, wherein the first spreader grating and the second spreader grating are both configured to spread the distribution of the light beams toward the center of the EPE grating.

22. The eyepiece of claim 20, wherein the first and second spreader gratings comprise diffractive optical features.

23. The eyepiece of claim 22, wherein the diffractive optical features of each of the first and second spreader gratings comprise a plurality of lines that form diffraction gratings.

24. The eyepiece of claim 23, wherein the diffraction grating of the first spreader grating is oriented at approximately 90° to a diffraction grating of the first OPE grating, and wherein the diffraction grating of the second spreader grating is oriented at approximately 90° to a diffraction grating of the second OPE grating.

* * * * *